UNITED STATES PATENT OFFICE.

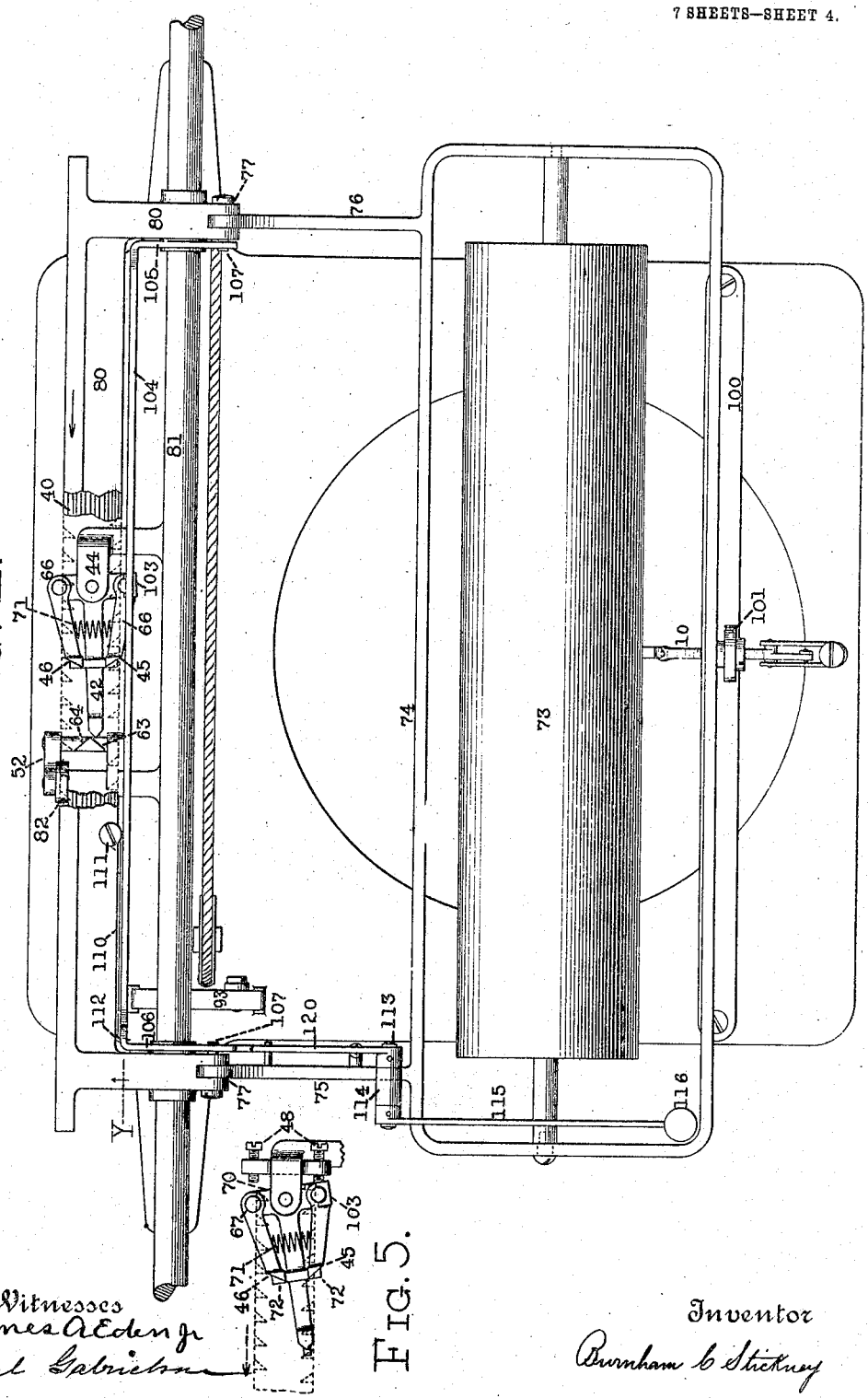

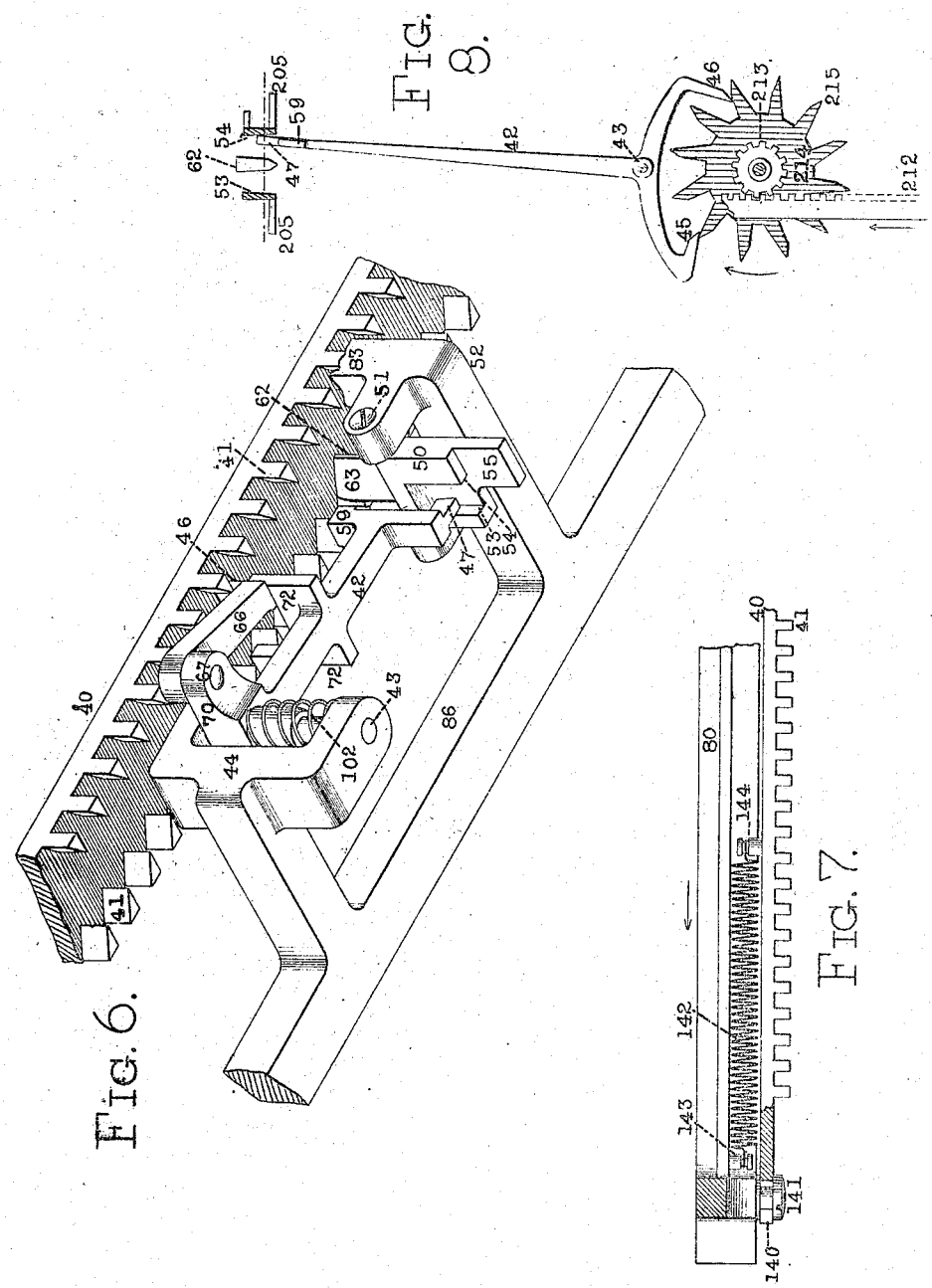

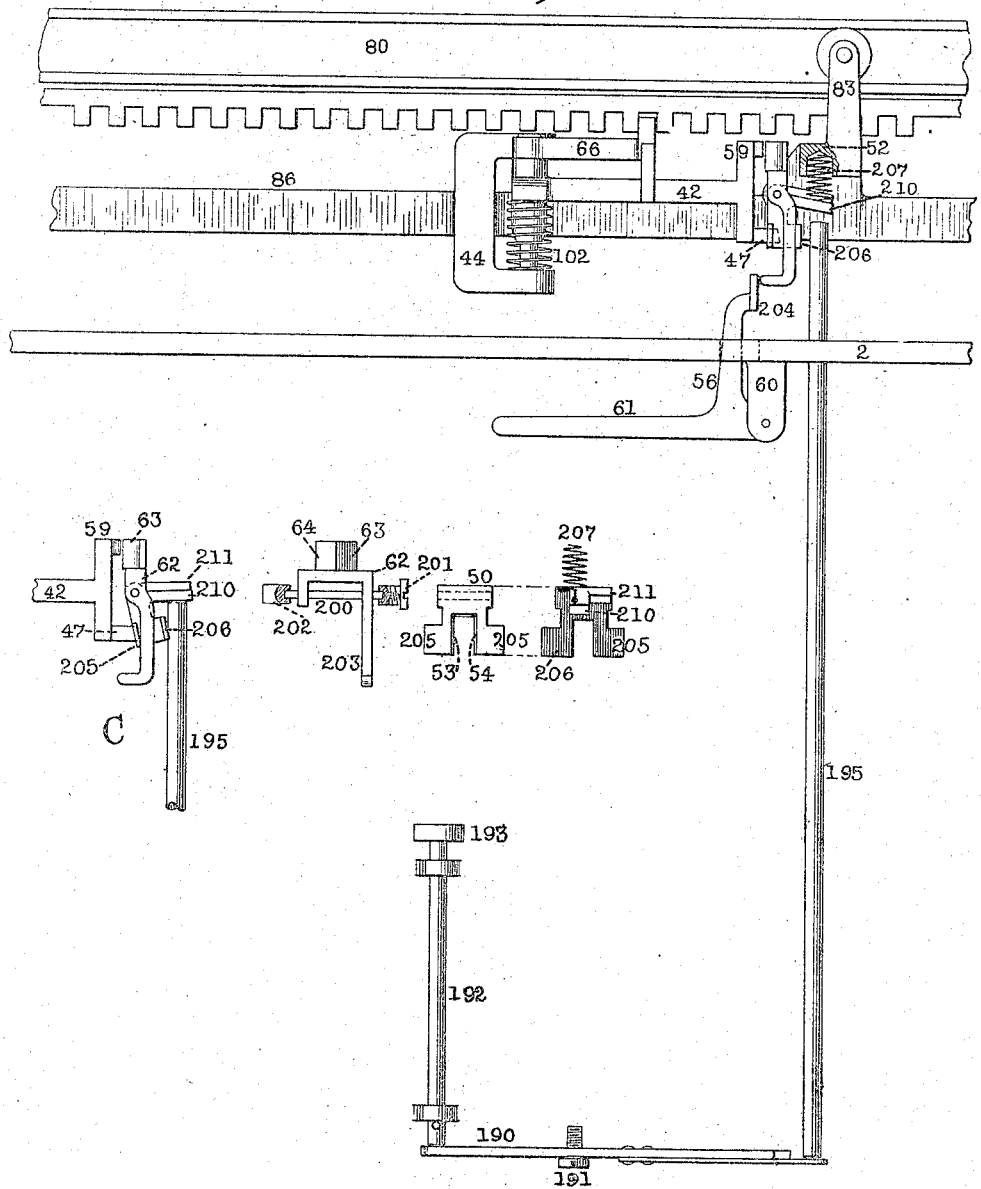

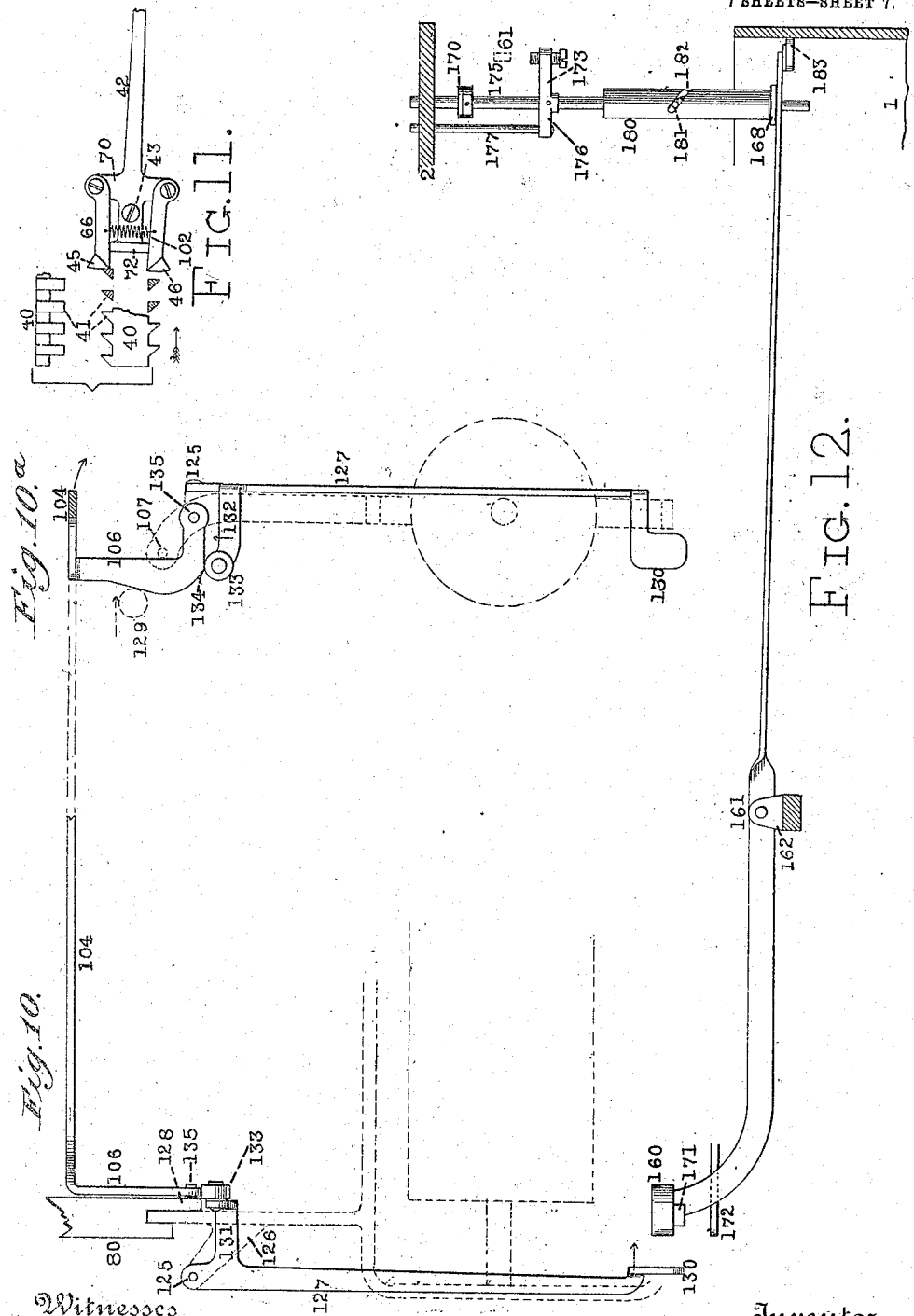

BURNHAM C. STICKNEY, OF ELIZABETH, NEW JERSEY, ASSIGNOR, BY MESNE ASSIGN-MENTS, TO UNION TYPEWRITER COMPANY, OF JERSEY CITY, NEW JERSEY, A CORPORATION OF NEW JERSEY.

TYPE-WRITING MACHINE.

937,336.     Specification of Letters Patent.     Patented Oct. 19, 1909.

Application filed December 7, 1897. Serial No. 661,037.

*To all whom it may concern:*

Be it known that I, BURNHAM C. STICK-NEY, a citizen of the United States, and a resident of Elizabeth, in the county of Union and State of New Jersey, have invented certain new and useful Improvements in Type-Writing Machines, of which the following is a specification.

In many of its features my invention relates more particularly to that class of type-writing machines made the subject-matter of United States Patents granted to me April 7, 1896, No. 557,711, and Feb. 2, 1897, Nos. 576,284-5-6-7-8, and 576,329, wherein the type-bar is automatically released and returns to its initial position independently and in advance of the finger key.

The object of the invention is to provide a type-bar releasing mechanism of novel construction; a novel carriage-feeding mechanism, enabling the machine to run accurately at high speed, with light touch upon the keys; a novel high-speed space-key contrivance, whereby the time required for spacing is minimized, without liability of irregular action of the machine, and without confusing the operator; novel means for preventing the rebound of a striker or other moving part when suddenly stopped; a "rapid spacer," whereby upon the depression of a key the carriage feeds rapidly and may be instantly stopped at any desired point, thus facilitating tabular work, headings, paragraphing, etc.; means for disengaging the carriage-feed from the keys, so that one character may be printed upon another, or a single column may be written down the page; and to otherwise improve the machine.

My invention consists in certain features of construction and combinations of devices, all as will be hereinafter more fully described, and particularly pointed out in the appended claims.

Figure 1:
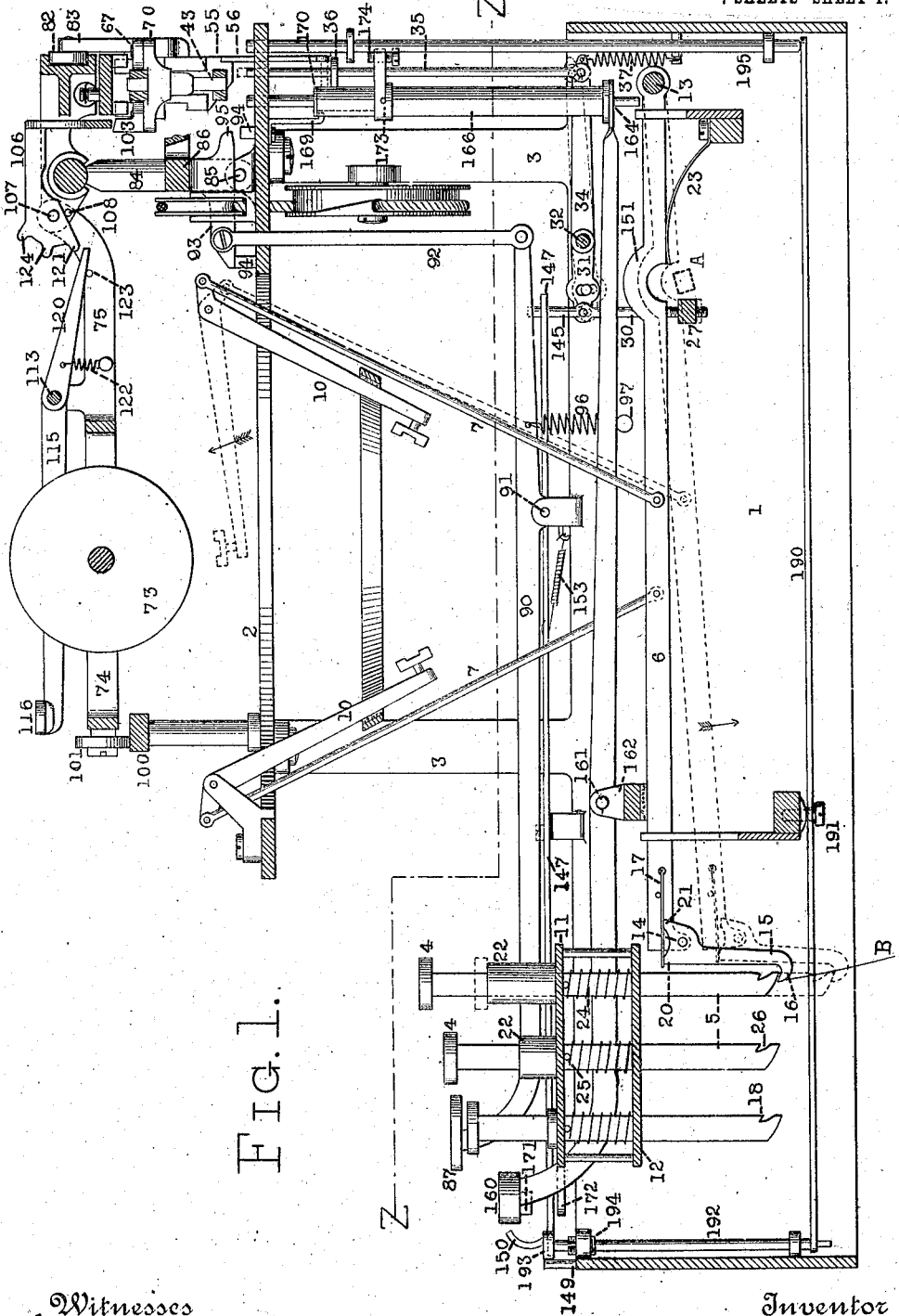
Figure 2:
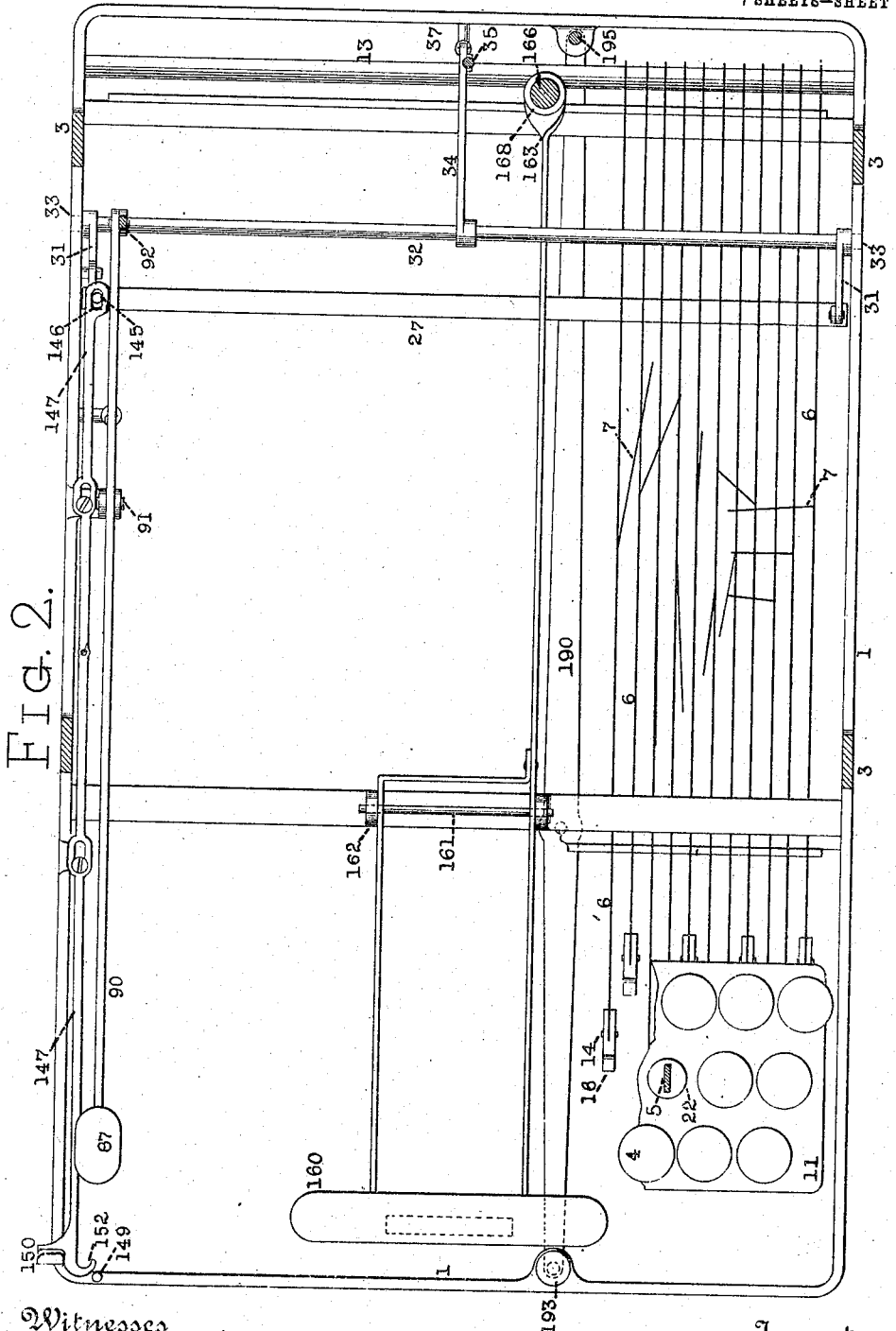
Figure 3:
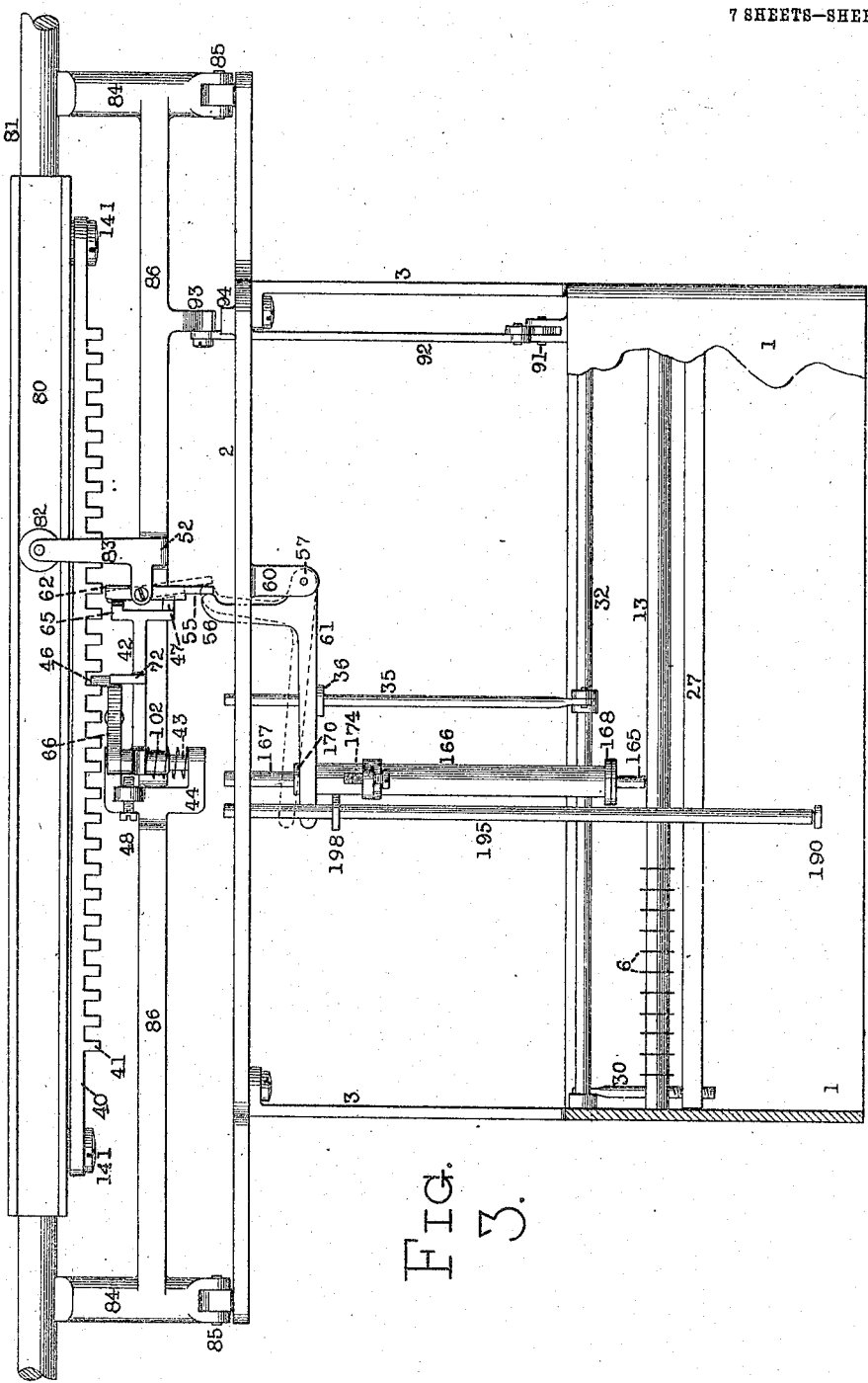

In the accompanying drawings, in which some parts are omitted and others broken away, for the sake of more clearly exhibiting the invention, Figure 1 represents a vertical central longitudinal section of a type-writing machine embodying my improvements; Fig. 2 is a sectional plan, taken at line Z Z, Fig. 1, and showing mechanism contained in the machine base; Fig. 3 is a rear elevation of the machine; Fig. 4 is a top view of the paper-carriage; Fig. 5 shows the carriage-escapement lever at one extreme of its vibration; Fig. 6 is an enlarged perspective view of the carriage escapement devices; Fig. 7 is a view taken at line Y, Fig. 4, and showing one construction whereby the rack is enabled to have an independent movement in advance of the body of the paper-carriage; Fig. 8 is a diagram showing a variation of the carriage-escapement mechanism; Fig. 9 is an enlarged rear view, disclosing a modification of the trigger and "rapid spacer" devices, and also showing four detached views of the modified trigger and check; Fig. 10 gives plan and Fig. 10ª elevation of modified carriage-releasing mechanism; Fig. 11 shows another variation of the carriage-feeding devices; Fig. 12 shows a modification of the space-key devices.

Similar characters of reference indicate similar parts throughout the several views.

Although my improvements are applicable in whole or in part to other classes of type-writing machines, I have chosen to illustrate them as applied to a machine of the well-known type-bar construction, in which a series of depending type-bars are arranged about a common printing-point, while the paper-carriage is power-driven.

1 represents the base of the machine, 2 the type-bar ring or top plate, 3 posts rising from the base to support the top plate, 4 the finger-keys (arranged as usual in several rows transversely of the machine), 5 the key-stems, 6 the type-bar operating levers, and 7 the connecting-rods, one extending from each key-lever to its associated type-bar 10.

*The trips.*—In place of positively operating the trip by and during the downward stroke of the key, as heretofore, I have arranged the release movement to occur after the key stroke is finished.

The key-support comprises an upper guide-frame or plate 11 and lower plate 12, arranged across the front of the machine, each having perforations to receive and guide the key-stems 5. The stems may be flat, and the perforations suitably elongated, so as to permit the vertical movement of the stem while preventing it from twisting or turning. By providing a fixed guide for the key-stem, instead of arranging it to loosely bestride its associated key-lever, the danger of binding the lever in its up stroke is avoided.

The rear ends of the type-bar operating levers 6 are pivotally mounted upon a common transverse fulcrum-rod 13. To the forward end of each lever is pivoted at 14 a depending trip 15, upon the lower end of which is formed a forwardly projecting hook or catch 16, which extends to a point directly beneath and in proximity to the foot of its associated key-stem 5. The movement of the key is transmitted through the trip 15, lever 6 and connection 7 to the type-bar 10. At the descent of the key-lever, the point of the catch 16, instead of traveling in an arc B struck from the key-lever pivot 13, is drawn forward to the abnormal position shown by dotted lines at Fig. 1; such abnormal movement being caused by the catch clinging to the foot of the beveled key-stem 5, and being permitted by the pivot 14. The independent swing of the trip is made in opposition to the pressure of a spring 17, which is fixed to the forward end of the key-lever and bears upon the top of the trip at a point 20, forward of the pivot, and also at a point 21, in rear of the pivot, thus holding the trip normally in a central position, but permitting its vibration in either direction. At the moment that the parts reach the dotted-line position, the key is arrested by pad 22, but the type-bar has yet a short distance to swing (by inertia) before reaching the platen; and during this complemental movement of the type-bar the trip 15, moving downwardly with the key-lever, will part from the key-stem, whereupon the spring 17 will cause it to return to its central position, so that the point of the catch will be upon the line B. The trip is now out of gear; and the type-bar, connecting-rod and key-lever resume normal position (assisted by the key-lever returning-spring 23). In its return movement the nose of the trip strikes the key-stem and rides up along the rear edge; so that when the key-lever reaches normal position the nose of the trip stands slightly in rear of normal position, and the shoulder 21 of the trip stands slightly above normal position, flexing the spring 17. It will be understood that during the descent of the finger key the point of the pivoted trip 15 is swung forwardly, as indicated by dotted lines at Fig. 1, and also that at the return of the trip and key lever to normal position, the nose of the trip rides up against the rear vertical edge of the key stem and that the lower end of said trip is moved slightly to the rear of the full line position indicated at Fig. 1; thus said trip vibrates in both directions from said full line position, and the tendency of the spring 17 in either case is to restore it to central normal position. Another key or keys may be manipulated before permitting the depressed key to return to normal position. When the finger is raised, the key is lifted by returning-spring 24, the lower end of which bears upon the lower frame 12, and the upper end upon a stop-pin 25 projecting from the side of the key-stem. When the foot of the key-stem rises above the catch, the spring 17, pressing down the rear shoulder 21 of the trip, snaps the catch 16 forwardly to normal position, thereby positively reëngaging the key to the type-bar. If it should be attempted to arrange the trip 15 like a pendulum, to be returned by gravity to normal position, it is obvious that there would not be sufficient promptness of action to swing the trip out of gear before the return stroke of the type-bar and key-lever. This defect of a gravity-operated trip could not be successfully overcome by stopping the key at the beginning of the printing-stroke of the type-bar, so as to allow more time for the trip to operate; since in that case the type-bar would fail to reach the platen. By the use of a spring I am enabled to carry the type-bar nearly to the platen, and yet jerk the trip out of gear with sufficient suddenness to avoid reëngagement of the parts upon the rebound of the type-bar.

It is not essential to the invention that the trip be pivoted upon the lever instead of upon the key-stem; and it is also immaterial whether this trip construction be applied to the machine illustrated, or is suitably modified to perform its office in other machines, as for instance those disclosed in my aforesaid patents, so long as the trip is adapted to transmit the movement of the key to the type-bar until the latter has almost reached the platen, and after the arrest of the key is jerked by spring-pressure out of engagement, so that the type-bar, with or without its connected parts, may resume normal position independently and in advance of the key. So long as the guide-frame 11 is arranged above the key-levers and trips, and near the keys, where it affords a satisfactory side-support for the stems, without danger of their binding, it is immaterial whether the guide-frame 12 be located as illustrated, or the stems prolonged and the frame located below the trips and levers.

*Repeating action.*—When writing at high speed, there is liability that the operator will sometimes fail to entirely release the key before depressing it a second time, when making such combinations as tt, ss, ll, ee, etc., so that there is no reëngagement of the key to the type-bar, and the second stroke of the key is without result. If it be desired to guard against such accidents, a notch 26 may be cut in the key-stem a little above the foot, whereby a projection 18 is formed upon the key-stem, which is adapted to engage the tooth 16 of the trip whenever the key does not return fairly to normal position before a second depression. This improvement may be readily adapted to other forms of trips, to secure the desired result, without departing from the scope of the invention. It is immaterial whether the projection 18 is placed upon the member that engages the trip or upon the trip itself.

*The universal bar.*—For causing the letter-spacing mechanism to operate at the actuation of any letter-key, a universal-bar 27 is arranged transversely beneath all the key-levers 6 at a point near their rear ends. To each end of the bar is secured a vertical hanger-rod 30, each of which is pivotally hung upon the forward end of one of a pair of short horizontal arms 31, extending forwardly from a transverse shaft 32, which is pivoted in the side walls of the base at 33. Upon depression of any key-lever 6 the universal-bar 27 will be forced down, carrying down the hangers 30 and arms 31, and the shaft 32 is rocked. The position at this time is shown by dotted lines at Fig. 1.

A rearwardly extending horizontal arm 34 is fixed to the shaft about midway of its length, to the rear end whereof is pivoted a vertical plunger 35, whose upper end is guided in the top plate 2. Near the upper end of the plunger is a fixed collar 36, as best shown at Fig. 3, by which the carriage-feed devices are actuated when the plunger is elevated by the rocking of the shaft, as will presently be explained.

When the type-impression has been made, the universal bar (for which if desired a weak counterbalance spring 37 may be provided) resumes its normal position simultaneously with the return of the type-bar, and independently and in advance of the return of the finger-key to normal position; so that the paper-carriage is fed a letter-space and the mechanism resumes normal position and is ready to receive another impulse before the finger-key has been relieved from pressure. Any other suitable means may be employed for transmitting the movement of the key to the letter-spacing devices herein set forth.

*The escapement lever.*—The usual construction of rack and feed dogs is open to many objections, of which a principal one is the hard and resisting touch to the finger keys, which must move the dogs as well as the type-bars, and must at the same stroke store up sufficient power in a spring to overcome the retarding pressure of the rack tooth upon the dogs and force the dogs to quickly resume normal position. The resisting, dragging action of the dogs, and the excessive force required to move them, are not consistent with the delicacy of action and high speed of operation required in a type-writer carriage escapement.

When operated at high speed, the type-bars often pass one another at a point near the platen, so that it is desirable to begin the operation of the universal-bar and feed devices during the final portion of the printing stroke of the type-bar, enabling them to resume normal position during the initial portion of the return type-bar stroke, as by such arrangement there is no liability of a type-impression being made without the accompanying operation of the feed devices. It has proved impracticable to incorporate this feature in machines having the usual construction of rack and dogs, because the extraordinary resistance offered by the dogs and returning-spring to being operated in so short a time is sufficient to effectively check the movement of the entire train of printing mechanism, and a faint impression of the type is left upon the paper. And as the moving parts of a type-writer are necessarily light, the excessive strain thereon arising from the ordinary construction of rack and feed dogs causes the mechanism to be uncertain and unreliable in operation. It is also impossible to secure a uniform movement of the feed dogs for all the finger-keys, which is a great desideratum. In order to overcome these objections, and make an easily operated, delicate, speedy and positive escapement, I have provided feed dogs which are actuated entirely by the rack, and have so connected the dogs to the finger-keys that the operation of the feed devices requires practically no power, even when the machine is run at high speed.

In carrying out this portion of my invention I have provided a lever, having a tooth or pallet that engages the rack, so that as the rack exerts pressure upon the tooth it tends to vibrate the lever; and for normally supporting or holding the lever against such pressure, I have provided a trigger, which may be operated by any finger-key to release the lever and permit it to be vibrated by and during the advance movement of the rack, until the lever-tooth escapes from the rack. I have provided suitable means for reëngaging the lever and rack, so that the latter is enabled to move step-by-step in the usual way, at each type impression. I preferably locate the trigger at a great distance from the lever axis, so that the lever exerts a very light pressure upon the trigger. The movement of the trigger is thus practically unopposed, and no demand is made upon the finger-keys for power to operate. The lever-tooth has one function in common with the ordinary feed-dogs, viz., it moves in and out of the rack-teeth and thereby permits the rack to advance; but the movements of the lever are caused by reason of the pressure exerted upon it by the rack itself, whereas the usual feed-dogs are moved by finger-pressure applied at the keys. As one method of securing the reëngagement of the lever-tooth with the rack, after its escape therefrom, I have provided the lever with a second tooth or pallet, also adapted to engage the rack, and which coöperates with the rack to vibrate the lever in the opposite direction and reëngage the first tooth with the rack. The construction of the lever and its teeth may be altered so as to cause the lever to act otherwise than herein described, or other means may be adopted for causing the lever-tooth to reëngage the rack after its escapement therefrom; but such variations would not involve a departure from the scope of my invention.

Referring more particularly to Figs. 3, 4 and 6, the rack-bar 40 may be provided with a series of downwardly-projecting inwardly-pointing teeth 41, arranged in two rows along the edges of the bar, the teeth in one row being opposite the spaces in the other row, and the teeth being spaced at intervals equal to two letter-spaces, say five teeth to the inch. The escapement-lever 42 is arranged beneath the rack, being fixed upon a vertical arbor 43, which works in the forks of a relatively fixed support or bracket 44. The lever is provided with a pair of oppositely disposed teeth or pallets 45, 46, which project upwardly in position to alternately engage the rack-teeth 41.

At Fig. 4 the pallet 46 is shown engaged to one of the rack teeth (indicated by dotted lines), and the pressure of the rack tends to swing the lever forwardly; and when the lever is released from the trigger it swings to the position shown at Fig. 5, at which point the pallet 46 escapes from the rack tooth. During this movement the rack advances say 1/30 of an inch. One of the forward row of rack teeth now engages the forward pallet 45, and forces the lever to swing rearwardly until the letter-space movement of the rack, say 1/10 of an inch, is completed, the rack and lever being stopped by the reëngagement of the latter with the trigger. The pallet 45 is still in engagement with the rack, and when the trigger again releases the lever the latter swings to its extreme rearward position, or until the pallet 45 escapes; whereupon the adjacent rack tooth upon the rear row engages the pallet 46 and vibrates the lever forwardly until the position at Fig. 4 is again reached, whereupon the rack and lever are again checked by the trigger. If the trigger were eliminated, the lever would continue to vibrate rapidly under the rack pressure. The trigger preferably stops the lever when the latter has completed a little more than half of its swing in either direction.

It is not essential that the lever or other feed devices herein described and claimed be used in a machine provided with tripping type-bars or a tripping universal-bar, although I prefer to use them in that connection, for reasons which will presently appear.

The gist of one portion of my invention resides in the provision of a tooth or feed-dog which normally holds the rack against advance motion, and which escapes from the rack during the advance motion thereof.

I believe that it is novel to provide two dog-teeth which alternately stop the carriage for successive type-impressions.

*The trigger.*—The escapement-lever 42 is provided at its free end with a trigger-engaging tooth 47, which coöperates with a trigger 50 to control the vibrations of the lever and permit the intermittent movements of the rack. The trigger is pivotally mounted at 51 in a relatively fixed forked bracket 52. It has two opposite working faces 53, 54, either of which may engage the lever-tooth 47; and an operating face 55, with which contacts the upper end 56 of an elbow lever, which is pivoted at 57 to a lug 60 depending from the top plate 2 (Fig. 3). The horizontal arm 61 of the elbow lever extends over the collar 36 on the universal-bar plunger 35, so that the movement of the universal-bar 27 is communicated through the plunger and elbow-lever to the trigger, causing it to release the lever-tooth 47, as shown by dotted lines at Fig. 3. To insure the reengagement of the lever-tooth 47 with the trigger, the latter may be provided with a check 62, which during the releasing action of the trigger moves into the path of a tooth 65 (Fig. 3) which is formed upon the escapement-lever above the tooth 47. During its inward swing the lever is first intercepted by the check, which detains it until the trigger resumes normal position, and then permits it to pass and engage one of the working faces of the trigger. The working faces 63 and 64 (see Figs. 4, 6 and 9) of the check may be made parallel; but they are preferably beveled, as illustrated, so that the power or impulse imparted by the rack to the escapement-lever may be utilized in forcing or assisting the check and trigger to resume normal position. Thus upon the operation of the trigger by a finger-key, the rack advances, and automatically re-sets and reëngages the trigger.

As illustrated at Fig. 4, the pressure of the lever against the trigger is about one-sixth of the pressure of the rack upon the pallet. By locating the trigger at a greater distance and correspondingly lengthening the escapement-lever, a greater difference in pressures may be secured.

The trigger, the universal-bar, and the parts connecting them, may be made light and sensitive; and they may be called into action during the completion of the printing stroke of the type-bar without liability of checking the type and weakening the print.

As the preferred form of trigger has two movements, one for releasing and the other for reëngaging the lever, it is peculiarly adapted for use in connection with a series of "tripping" type-bars, since at the initial stroke of the type-bar the trigger may be actuated to release the lever and carriage, without liability of blurring the print (as more fully explained in my said patent No. 557,711): and at the return stroke of the type-bar the trigger may reëngage the lever and stop the carriage. This permits the employment of simple and positive connections between the universal-bar and the trigger.

Innumerable variations may be made in the construction or arrangement of the rack, escapement-lever, pallets, or trigger mechanism, without departing from the scope of the invention. The invention is also applicable to machines in which it is desirable to use a fixed rack, the feeding devices being arranged upon the traveling carriage. It is not essential that the check be actuated by the escapement-lever, so long as the proper reëngagement of the lever with the trigger is assured.

*Carriage return.*—The carriage may be pushed back to begin a new line, or a less distance, independently of the escapement pallets 45, 46, since they are not rigidly secured to the lever but are pivotally mounted thereon in a manner that permits them to move with the lever during the advance movements of the carriage, and also to move independently of the lever during the return of the carriage. Each pallet is fixed upon the end of an arm 66, pivoted at 67 to a cross-bar 70 formed upon the escapement-lever. The arms 66 are pressed apart by a light spring 71, and their outward vibration is limited by stops 72 formed on the escapement-lever. The pressure of the rack tends to hold the pallet arms against the stops 72, so that the pivotal mounting of the pallets upon the lever does not affect the escapement movements thereof. At the reverse movement of the carriage the beveled faces of the rack teeth 41 strike the pallets, pressing them alternately inwardly, compressing the spring 71, which forces the pallets outwardly alternately as they escape the rack teeth. At the reverse movement of the carriage the escapement-lever 42 vibrates slightly under the alternate impulses imparted by the rack teeth; but it remains confined between the working faces 53, 54 of the trigger, and at the cessation of its return movement the rack may reengage either of the escapement pallets. The gist of this portion of my invention resides in the provision of dog-teeth which alternately engage the rack to stop it for successive type-impressions, and means for enabling the rack, when returned, to engage either tooth.

It is not essential that the pallets move independently with relation to each other. They may be loosely mounted upon the escapement-lever in various ways.

*The paper-carriage.*—The cylindrical platen 73 may be supported as usual in an oblong frame 74, provided with hinge-arms 75, 76, by which it may be pivoted at 77 to the rack-frame 80, so that the platen-frame may be swung up to expose the writing. The rack-frame may slide upon the rail 81, and may be provided with a rear supporting-roll 82, working between flanges formed upon the rack-frame, and secured to a vertical arm 83 of the bracket 52. The usual paper-feeding devices and ribbon mechanism are omitted. The carriage may be driven as usual by the spring-drum shown at Fig. 1, from which a cord is carried up and passed over a pulley to the rack-frame. Any suitable carriage may be employed. My feeding devices are applicable also to machines of other classes, such as type-wheel machines, and those in which the paper remains stationary while the type-carriage moves at each impression.

*Platen shift.*—Each type-bar may be provided with two types, as usual. The guide-rail 81 may be secured to the tips of a pair of vertical rocker-arms 84, pivoted at 85 to lugs on the top plate 2; and the arms may be united by a transverse bar 86, upon which the escapement mechanism may be mounted. A shift-key 87 may be fixed to the forward end of a lever 90, pivoted between its ends at 91 to a lug on the base, and at its rear end connected by a vertical link 92 to a horizontal arm 93 extending forwardly from the transverse bar 86. Shift-stops 94 may be provided, one to coöperate with arm 93, and the other with arm 95 (Fig. 1). A spring 96, attached at one end to a pin 97 in the base, and at the other to lever 90 at a point back of its pivot, may be provided for returning the shifted parts to normal position. The front supporting-rail 100, upon which travels the roll 101, is broadened, to permit the fore and aft sliding movement of the roll.

At the shifting operation the entire mass of feed mechanism, including the rack frame, is swung rearwardly about the axis 85. The working face 55 of the trigger is broadened, so that the arm 56 of the elbow-lever may also actuate it when it is in the shifted position.

Any suitable capital-shift mechanism may be employed. Certain features of the herein described shift devices are broadly claimed in my application filed Dec. 31, 1896, Serial No. 617,557, and they are shown herein merely for the purpose of illustrating one method of combining and arranging my improved letter-spacing and capital-shifting devices. The claims in this application are limited to features not disclosed in my said application.

*Carriage release.*—The spindle 43, upon which the feed-lever 42 is fixed, is vertically movable in its bearings, a spring 102 serving to support it. One of the pallet-arms 66 (Figs. 1 and 4) is provided with a shoulder 103, over which runs a release-bar 104, bent at its ends to form arms 105, 106, which are pivoted upon nipples 107 formed upon the inner ends of the platen-frame hinge-screws. For lifting the bail a spring wire 110 may be provided, having an eye at one end, so that it may be screwed fast to the rack-frame at 111; and the other end may be bent downwardly and hooked beneath the release-bail at 112. The spring presses the bail arm against a stop pin 108 projecting inwardly from the arm of the rack-frame (Fig. 1). When depressed the bail contacts with the pawl-shoulder 103, forcing it down, together with the feed-lever 42, until the pallets are freed from the rack-teeth; whereupon the carriage may be moved rapidly in either direction. The spring 102 (Figs. 3 and 6) returns the feed-lever to normal position.

For conveniently operating the bail, there may be provided a lever made in two parts, each of which is fixed to a short transverse shaft 113 (Fig. 4), which works in a boss 114 formed on the platen-frame. One arm 115 of the lever extends to the front of the platen-frame and bears a depressible finger-key 116; the other arm 120 extends rearwardly to a point nearly beneath a finger 121 formed upon the forward end of the bail-arm 106. Upon depression of key 116 the shaft 113 is rocked, arm 120 lifted, contacting with finger 121 and lifting the same, whereby the release-bail is depressed. The draw-spring 122 will return the lever to normal position, pressing against the stud 123 upon the hinge-arm 75. When the platen-frame is swung up, the tip of arm 120, moving in an arc about the pivotal point 107, clears the finger 121; and one or more additional fingers 124 may be provided, so that the carriage may be released by pressing the lever 116 either when the platen-frame has been swung to its highest position, or at intermediate points.

At Fig. 10 is shown in plan and elevation a modified release-key lever, pivoted at 125 to an arm 126 projecting from the hinge-arm of the platen-frame. The forwardly-extending arm 127 of the elbow lever is provided with a vertical finger-key 130; and the inwardly-extending arm 131 is bent vertically at 132, the upper end being preferably provided with an anti-friction roll 133, bearing upon the bail-arm 106 at a point 134. The bail is here shown pivoted upon studs 135, projecting from downwardly and forwardly curving extensions 128 formed upon the rack-frame. Only one extension 128 is shown, as the opposite one is similar, and the pivotal points 135 are axially in line. Pressure applied horizontally to the finger-key causes a rearward movement of the bearing-roll 133, as indicated by arrows; and this causes the depression of the release-bail. When the platen-frame is raised, the roll 133 is in the dotted-line position 129; and if the release-key be now manipulated, the movement of the roll will be downwardly, producing a similar movement of the release bar 104. In this modification the manual pressure is applied in a manner to relieve the pressure of the rack upon the feed-dogs, so that the separation is more easily effected; but any suitable releasing mechanism may be used in connection with my present carriage-feeding improvements. The operating arm 106 may be otherwise connected to the release bar 104; and the latter may have other than a downward movement, if required.

*Independent advance movement of the rack.*—As it is desirable to have a light tension upon the carriage-driving spring, and as the carriage is comparatively heavy and consumes time in making a letter-space movement, there is liability in rapid writing that the trigger will be operated before the carriage has advanced far enough to reëngage the escapement-lever with the trigger; in which case one letter will be printed upon another. I have succeeded in remedying this difficulty by providing an independent quick movement of the rack, so that the lever is reëngaged to the trigger by the time the body of the carriage has completed half a letter-space movement.

At Fig. 7 the rack is shown supported at each end upon broad-headed screws 141, which fit in open longitudinal slots 140 in the ends of the rack. The length of the slots is sufficient to permit say 1/20 of an inch play of the rack between the screws, each of which serves as a stop. A draw-spring 142 connects rack-stud 144 and frame-stud 143, so that there is constant tension to move the rack in letter-space direction. As the power of the carriage-driving spring (exerted in the direction of the arrow) is superior to that of spring 142, the latter is normally distended. As soon as the rack is released by the operation of the trigger, the spring 142 immediately shoots the rack ahead of the body of the carriage, causing the reëngagement of the escapement lever with the trigger by the time the carriage has moved half a letter-space. As the carriage completes its movement the spring 142 is again distended. Without departing from the scope of this portion of the invention, the rack may be otherwise moved in advance of the carriage, the use of spring 142 not being essential. The independent advance movement of the rack may be employed in connection with other descriptions of carriage feed, working upon other principles, So long as the desired prompt action is obtained, it would not be a departure from the invention if the escapement-lever and trigger or equivalent feed devices were moved bodily slightly with reference to a rack rigidly attached to the carriage, as such change would be mere transposition.

It may now be pointed out how the various features of my improvements coöperate to make a machine that may be run at high speed without undue effort, and without any evidence of speed being visible upon the written page.

When the type-bar reaches the neighborhood of the platen, the universal-bar and trigger are operated without checking the type-bar, and the carriage is released prior to the impression of the type. At the moment when the type is in contact with the paper, the weighted platen-frame is gathering headway, the rack is shooting ahead and vibrating the feed-lever, a succeeding key is being operated without waiting to release the first key, and a second type-bar is swinging toward the platen. The first type-bar rebounds from the platen, leaving a clear impression, as there is no possibility of the type being held in contact with the moving platen by involuntary continued pressure upon the key by which it is operated. While the first type-bar is yet in the neighborhood of the platen, the trigger and universal-bar have resumed normal position, and the feed-lever is reëngaged to the trigger, although the carriage has not yet stopped. The second type-bar passes the first at a point sufficiently distant from the platen to enable the types to clear each other, and the second type reaches the platen by the time the latter has completed its movement. The trigger is operated and the rack released, therefore, before the completion of the carriage movement, but no irregularity appears in the work.

It should be noted that the tension of the carriage-spring may be increased to any desirable extent, so as to insure the rapid movement of the carriage-frame, without in the least retarding the operation of the feed-dogs or rendering them liable to irregular action; in fact without having any effect upon them except to cause them to act even more promptly and surely. Such increase of carriage-tension is not accompanied by an increased demand upon the universal-bar or finger-keys, so that the machine may be operated at high speed by a light touch upon the keys, the high speed of manipulation being permitted by the use of the tripping devices.

Prior to my invention operators could not reach the most satisfactory proficiency, partly because the necessity of releasing one key before depressing the next rendered the highest speed of manipulation unattainable; and partly because the machine would fail to respond when operated at great speed unless both the carriage-tension and feed-dog tension were greatly increased, the latter making the work of the fingers much harder. This broad feature of my invention depends upon the combination with a series of finger-keys, a series of type-bars and a power-driven carriage of means for reducing the pressure of the rack upon the finger-operated devices, and means for enabling the keys to successively operate the type-bars and carriage-feed devices without release-ment of the keys.

In carrying out this feature of my invention, the usual escapement-dogs may be engaged directly to the escapement-wheel 214 shown at Fig. 8, whereby the pressure of the rack upon the feed-dogs is diminished in proportion to the difference in diameters of the rack-pinion and the escapement-wheel; or other means may be employed for reducing the rack-pressure upon the finger-operated feed-devices. It should also be noted that an increase of carriage-tension (which it will be understood may be accomplished by keying up the carriage-driving spring in the usual manner) does not call for a readjustment of the dog-operating or universal-bar-operating spring; and that no other effect is produced upon the universal-bar and connections than to cause them to return more promptly to normal position, through the action of the feed-lever upon the beveled faces of the check 62.

*Feed-switch.*—In order to enable the operator to write one character upon another, or to write a single column of characters down the page, means may be provided for switching the feed mechanism out of gear with the finger-keys, as illustrated at Figs. 1 and 2. One of the hanger-rods 30 is extended at 145 above its pivotal connection to the crank-arm 31. The extension works in a slot 146 formed in the rear end of a pull-rod 147, which extends to the front of the machine and is provided with a suitable finger-hook 150. When the rod is drawn forward, the universal-bar is swung back to the dotted-line position A, and beneath the arched portion 151 of the key-levers, so that it remains unmoved during the operation of the levers, and the feed devices and carriage likewise remain at rest.

If desired to hold the universal-bar at position A, so that a line may be written down the page, a hook 152 may be provided at the forward end of the pull-rod, which may catch over a vertical stud 149 in the top edge of the front wall of the base. If it should now be desired to move the carriage in letter-space direction, the release-key, the space key or the rapid-spacer may be manipulated. A spring 153 may return the pull-rod to normal position.

The gist of this portion of my invention lies in the provision of means for effecting a temporary disconnection between the finger-keys and carriage-feeding mechanism; and without departing from the scope of the invention the mechanism may be widely varied to suit the requirements of different machines.

*Single-space key.*—The broadened space-key 160 may be located as usual at the front of the key-board, and is preferably mounted upon the forked forward end of a horizontal lever of the first order, pivoted upon a transverse pin 161, which is supported in lugs 162 rising from the key-lever stop-bar. The rear end of the lever may be twisted at 163, and perforated at 164, to receive the reduced end 165 (Fig. 3) of a vertically arranged cylindrical plunger 166. The latter is also reduced at its upper end at 167, and passes through a guide-hole in the top plate 2. Sound-deadening washers 170 and 168 may be placed at top and bottom of the plunger. A guide-finger 169 (Fig. 1) may be secured to the top plate and work in a longitudinal groove cut in the periphery of the plunger, to prevent rotation thereof. The weight of the plunger is preferably sufficient to return the key to normal position after operation. A felt buffer 171 may be placed upon the under side of the key, to soften the blow of the key upon the shelf 172.

The operation of the feed mechanism by the space key depends upon the momentum of the plunger 166. Should the key be depressed slowly, the plunger would ascend until the adjusting-screw 174 on the horizontal plunger-arm 173 nearly or quite touched the horizontal arm 61 of the trigger-operating elbow-lever; but the trigger would not be moved a sufficient distance to release the feed, or to prevent the operation of the feed by the type-keys while the space key is held down. But when the space key is actuated at the usual speed, the momentum acquired by the plunger causes a continuance of its upward movement after the space-key has completed its down stroke; and this additional movement of the plunger is sufficient to cause the trigger to release the escapement lever 42 and permit the advance of the carriage. The type-keys may now be operated, whether the space-key is released or not; as, if the key is not released, the plunger falls far enough to release the elbow-lever and trigger.

So long as a type-bar key may be actuated to operate the feeding mechanism while the space-key is held down, it is immaterial what means are used to automatically relieve the feed devices from the control of the space-key. I deem the combination of a releasing space-key with a series of keys which operate the type-bars and feed as one of great importance, since it has been experimentally proven that by this combination the time consumed in operating the space-key is substantially diminished, so that the operation of the type-keys may continue without appreciable pauses for the operation of the space-key.

The general speed of the machine illustrated is limited by the time required for each type to clear the succeeding type; but in case of the operation of the space-key between two type-strokes this limitation is removed; and the last type-key for a word, the space-key and the first type-key for the next word may be actuated as rapidly as the mind can grasp the order of their operation, and without regard to relieving any key of finger-pressure.

Sundry attempts have been made to economize time by adapting the space-key to be actuated simultaneously with the last letter of a word; but higher speed is gained by my combination, while the operator is subjected to less mental strain. The advantage gained by this combination is considerably enhanced by the release of the carriage being effected by the initial or first movement of the parts set in motion by the down stroke of the space-key. It is also enhanced by the fact that the space-key operates independently of the universal-bar, so that there are fewer parts for it to actuate.

So far as my invention relates to the space-key, it may be used in connection with other forms of releasing type-keys, universal-bars, and carriage-feeding devices.

*Modified space-key devices at Fig. 12.*—As the trigger is so easily operated, there is liability that when the space-key is struck with excessive force the plunger will, after falling upon the upraised lever, rebound therefrom and succeed in operating the trigger a second time, producing a double space between words. To overcome this difficulty, the plunger, or what I may term a "striker", may be made of a slender rod 175, having a fixed cross-arm, one portion 173 of which bears the adjustable operating screw, and the other portion of which bears a vertical guide-finger 177, which passes through a guide-hole in the top plate 2, to prevent the rotation of the plunger. Arranged upon the rod is a loosely fitting sleeve 180, of suitable weight. A fixed stud 181 upon the plunger engages a diagonal slot or perforation 182 cut in the sleeve. The weight of the sleeve is preferably borne directly by the lever, instead of by the plunger pin 181. When the plunger is thrown up, the buffer 170 contacts with the under surface of the top plate, bringing the rod 175 to rest; but the momentum of the sleeve causes it to continue upward in a spiral path, owing to the engagement of the pin 181 with the diagonal slot. During this rotary movement the sleeve maintains an upward thrust upon the pin 181, supporting the plunger momentarily in its elevated position, and effectually preventing rebound or dancing. The sleeve will afterward fall in a spiral path to its normal position.

When the space-key is operated at moderate speed the plunger and sleeve move together as if made in one piece, so that only when excessive force is applied to the space-key is any power lost. The weight of the sleeve assists in returning the space-key. A padded rest 183 may be provided for the rear end of the lever.

The described device for preventing rebound after impact I believe to be new, and it may be used in other machinery than type-writing. The shaft 175 may be rotary, in which case the sleeve 180 would continue to rotate in a spiral path after the arrest of the shaft. If the shaft be arranged horizontally, the weight may be returned by a suitable spring. It is not essential that the plunger or weight be round, so long as the weight moves diagonally after the impact.

*Rapid spacer.*—Should a light yielding continued upward pressure be applied to the arm 61 of the elbow-lever (Fig. 3), the carriage would move rapidly along in letter-space direction, the action being as follows: The elbow lever and trigger are moved by the pressure to the dotted-line position, releasing the escapement-lever 42; the rack causes the latter to vibrate, and in its return vibration the lever-tooth 65 strikes the beveled check 62 with sufficient force to vibrate it, together with the trigger and elbow-lever, to normal position, against the opposition of the light upward pressure upon the elbow lever. Then the elbow-lever and trigger are again vibrated in response to the continued pressure, and the entire operation is repeated indefinitely. The carriage moves along at fair speed, as the feed movement consumes little time. I have arranged a finger-key which is adapted to communicate the described yielding upward pressure to the elbow lever, so that by simply holding the key down the operator is enabled to produce long spaces in the written work. This is simpler and less laborious than operating the usual carriage-release key, or repeatedly tapping the usual space-key. The carriage stops instantly when the pressure is released. I term this device the "rapid spacer," to distinguish it from the single-space key already described.

The rapid spacer comprises a horizontal flexible lever 190 of the first order (Figs. 1 and 2), loosely secured to the transverse key-lever-guide bar by a screw 191; a key-stem 192 which actuates the forward end of the lever and to which is secured a key or cap 193, the movement of the key being limited by the hollow or tubular adjusting-screw 194, in which the stem is guided; and a slender vertical plunger 195 resting upon the rear end of the key-lever and provided with a collar or shoulder 198 just beneath the arm 61 of the elbow lever 61 (Fig. 3). When the forward end of the lever 190 is depressed by the key, the rear end exerts a yielding upward pressure, through the rod 195, upon the arm 61, with the described result.

Other means may be employed for applying a continued yielding pressure to the trigger or its equivalent. The rapid operation of the carriage feed, caused by a continued pressure upon a key, is a novelty in the art, and may be produced by other means used in connection with other carriage-feeding devices, without departing from the scope of the invention.

*Modified trigger, check and rapid spacer at Fig. 9.*—There is some liability, especially when weak and springy universal-bar devices are employed, that an occasional momentary dwell of the universal-bar and connections in their operative positions will supply the yielding pressure upon the trigger just alluded to, so that there will be a spurious operation of the trigger and feed, leaving a blank between two letters of a word. This dwell of the universal-bar may be prevented, if desired, by adapting it to move slightly by momentum after the type-impression, thereby completing the releasing movement of the trigger; at which moment the crank-arm 31 may be arrested by the pin shown at Fig. 1, so that the return of the universal-bar and connections will take place promptly.

Another method of overcoming the difficulty, whereby the release of the carriage may be positively effected during the printing stroke of the type-bar, without risk of double feed of the carriage, is illustrated at Fig. 9. The trigger and check are made separately, but mounted concentrically, so that in usual operation they move practically as one piece in the manner already described. Through the forked portion of the check 62 is passed an arbor 200, the ends whereof protrude and may work in any suitable bearings, such as a screw 201 or bushing 202, each of which is provided with a suitable end depression to receive the arbor, to which the check is rigidly attached. Any suitable type-bar bearing may be used, so as to secure the required freedom of action and steadiness. One of the forks is extended downwardly to form an operating arm 203, which is bent at its lower end, to bear against the working face 204 of the elbow lever. The trigger 50 is freely hung upon the arbor 200 between the forks. If desired, the working faces 53, 54 of the trigger may be slightly beveled outwardly, in a manner to facilitate the release of the escapement-lever tooth 47.

The trigger is preferably provided with a pair of wings or guards 205, whereby it is prevented from accidentally resuming normal position while the escapement lever is at the outer limit of its vibration. The trigger is also provided with a lateral lug 206, which normally bears against the operating arm 203 of the check, so that the trigger is operated by the check-arm. The trigger is preferably provided with a weak returning-spring 207, the upper end of which may be housed in a depression formed in the under side of the arm 52, and the lower projecting end of which may enter a hole drilled in a horizontal arm 210 with which the trigger is preferably provided.

The escapement tooth 47 is elongated, so that the check and trigger must swing through a greater arc in order to release the tooth. This decreases the sensitiveness of the trigger hereinbefore alluded to, as the escapement-lever tooth 59 works at a greater disadvantage in returning the trigger to normal position. If this principle is carried to such an extent that it becomes necessary to positively withdraw the operating pressure in order to permit the trigger to return, all liability to a second or spurious operation of the trigger will be eliminated. Or if the check be made with parallel sides, so that the trigger must be returned by spring 207, the same result is secured. I prefer, however, the construction at Fig. 9, whereby the rack is enabled to impart a strong impulse to the check, while the comparatively long tooth 47 cures undue sensitiveness of the trigger when operated by type-keys or single-space key.

At Fig. 9 the rapid-spacer plunger bears directly up against the horizontal trigger arm 210, moving it to the position shown at C, so that the check is operated by the trigger wing 205. This has the effect of temporarily rendering the trigger very sensitive, as obviously only a slight vibration of the check is required during the rapid spacing operation. While the plunger 195 is in working position, the trigger and check maintain the relative positions shown at C and move as one piece. If the weight of the plunger is increased, the carriage moves less rapidly.

In order that the rapid spacer may operate when the shifting-frame, rack and feed are tilted over to the capital shift position, the trigger may be provided with a second horizontal arm 211, in front of and a little higher than the arm 210, to compensate for the backward and downward swing of the trigger about the shift-pivot 85.

Other means may be used to temporarily sensitize either the illustrated feed devices or others, so as to permit the "rapid spacing" of the carriage, without departing from the scope of the invention.

*Variation at Fig. 11.*—As the rack teeth may be more cheaply cut when they point outwardly, I prefer the construction of rack and escapement-lever shown at Fig. 11, in which the working portion of the rack teeth projects below the body of the rack. The pallets 45, 46 are arranged upon the opposite side of the lever pivot 43; the spring 102 is a draw-spring; and the stop 72 is arranged between the pivoted pallet-arms instead of outside of them; but the general operation of the device is similar to that already described. The length of the lever 42 from pivot to trigger may be made four or five times the breadth of the rack, with satisfactory results.

*Variation at Fig. 8.*—For the purpose of illustrating one of the innumerable variations that may be made in the construction of the rack and escapement-lever without departing from the spirit of the invention, I have shown at Fig. 8 a series of circularly arranged rack-teeth 215, carried by a wheel 214. For operating the latter a rack 212 may be secured to the paper-carriage in any suitable manner, so that it will mesh with the pinion 213, which in turn actuates the escapement wheel 214, the escape movements whereof are permitted by the pallets 45, 46, secured to the escapement-lever 42, which in turn is controlled by the trigger and check in substantially the manner already described. The escapement movement of the wheel at each key actuation is equal to half the space between its teeth 215.

Any well-known or suitable device may be arranged between the pinion 213 and wheel 214, to effect the release of the carriage. It is not necessary for the wheel 214 to rotate when the carriage is being returned.

At Fig. 8, the circular escapement rack 215 tends to rotate to the right. The left-hand tooth 45 of the escapement lever is pressed by the rack tooth so as to cause the tooth 47 on the end of the lever 42 to bear against the working face 54 of the trigger, whose construction is substantially the same as shown in Fig. 6. Upon the vibration of the trigger away from the tooth 47 of the lever, the latter is forced by the rack 215 to vibrate to the right until the tooth 45 escapes from the rack tooth, whereupon the tooth 46 is engaged by a rack tooth, and the lever is caused to vibrate in the opposite direction. During this reverse vibration of the lever, its tooth 47 may contact with the right-hand wing 205 to prevent the trigger from prematurely resuming normal position. As the reverse movement of said lever continues, the tooth 59 thereon contacts with the beveled portion of the check 62 and insures the return vibration of the trigger, bringing the working face 53 thereof into position to engage the tooth 47 of the lever, whereby the lever, rack and carriage are arrested.

Upon re-actuation of the trigger by the finger keys, the operation is substantially repeated, the lever, however, swinging toward the left and then back again to the position shown at Fig. 8, again arresting the rack and carriage. It will be understood that the parts 53, 54, 62 and 205 at Fig. 8 swing in unison upon the trigger axis, and correspond substantially to parts shown in other views and designated by the same numerals of reference. If the check 62 has nearly parallel sides, as here illustrated, it may be provided with a greater bevel near the working edge, so as to gain the sensitiveness necessary for the proper operation of the rapid-spacer mechanism. The lever 42 may radiate in any direction from the pivot 43, and may be of any desired conformation, to meet the requirements of different machines.

The following features of construction and operation are noted:

The type bar and finger key are combined with an intermediate trip which positively transmits the movement of the key to the type bar during the entire key stroke and until the type bar nearly reaches the platen, and the spring 17 thereupon suddenly jerks the trip out of gear so that the type bar may return from the platen to normal position independently and in advance of the key. The trip 15 has four independent vibrations upon its pivot at each key operation, viz:— first, a movement to one side or forwardly during a key depression; second, a return to normal position relatively to the key lever, whereby the trip is released from the key stem, so that the type bar is disconnected from the key; third, a movement to the other side of normal position or rearwardly, this vibration occurring by reason of the contact of the nose of the trip with the rear vertical edge of the key stem as the key lever 6 resumes normal position; and fourth, a return to normal position re-connecting or reëngaging the key with the type bar upon the return to normal position of the key. The spring 17 presses upon the trip 15 at two points, so as to return the latter to an intermediate position after vibration in either direction.

At the time the key is arrested by the pad 22, the type is in proximity to the platen but the impression has not been made. The trip 15 is positively connected to the type bar, and disconnection is effected between the key and the trip during the terminal portion of the stroke of the type bar. Each key stem 5 is arranged in proximity to the free end of its associated operating lever, and the keys are arranged in transverse rows. The keys are successively operated without releasement; that is, one type key may be depressed and held down during the operation of another type key, or in other words, a number of type keys may be consecutively depressed to cause their types to make impressions upon the paper, without releasement of any of said type keys. The projection 18 enables the key to again actuate the type bar without the necessity of the key first returning entirely to normal position, as the projection 18 enables the reëngagement of the key, trip, and type bar during the second down stroke of the key.

Through the pallets or dogs 45 and 46 and the lever 42, the pressure of the rack upon the finger-operated trigger 50 is reduced, so that in disengaging the trigger from the lever 42 there is much less friction to be overcome than in disengaging the usual escapement dogs from the usual escapement rack. Hence the movement of the trigger is accomplished with less power than the corresponding movement of the usual feed dogs, and the touch upon the keys is rendered proportionately easier. Each of the teeth or pallets 45, 46, is normally in position for engagement with the rack to detain the latter. Hence upon the carriage being pushed back or from left to right, either of the teeth 45 or 46 may engage the rack and detain it. Each pallet escapes from the rack during the advance of the latter, and is reëngaged with the rack by a movement of the lever 42, which movement is imparted to said lever by the rack acting upon the other pallet. In other words, after escaping from the rack, either pallet is brought into reëngagement by the action of the rack upon the other pallet. The escapement action of the pallets or dogs is controlled by the key-operated trigger 50, which engages the free end of the lever 42 and normally prevents the movement of the latter under the pressure of the rack. The pallets alternately engage the rack and escape therefrom during the advance movements of the rack and carriage, and alternately detain the rack for successive type impressions; that is to say, one impression is made, while the rack is detained by the pallet 45, the next impression is made while the rack is detained by the pallet 46, and so on.

The check 62 upon the trigger insures the reëngagement of the lever with said trigger. The trigger releases the lever 42 and hence the feed dog and carriage at or during the printing stroke of the key and type bar, and at the initial stroke of the tripping universal bar 27. The vibrating movement of the lever 42 and its dogs after such release is independent of the type key, and is caused by the carriage rack, which latter by vibrating said lever 42 effects a re-connection of the feed dogs to the universal bar and type keys. Each of said pawls or dogs turns upon one pivot (43) to escape from the rack during the advance movements of the carriage, and upon another pivot to permit the return movement of the carriage independently of the lever 42.

The finger lever 127 bears in one direction upon the operating arm 106 of the carriage release bar when the platen frame is down in working position, and in another direction when the platen frame is swung up to expose the writing, as indicated by the arrows at Fig. 10ª.

The series of escapement teeth 41 advance in letter feed direction independently of the carriage during the feeding movements of the latter. The relative movement between the escapement teeth and the dogs which occurs at this time is for the purpose of bringing said dogs to a position for a new actuation thereof, before the completion of the advance movement of the carriage. So long as the relative movements of the rack and dogs are thus completed during the feeding movements of the carriage, it is immaterial how the relative movements between the rack and dogs are secured. By means of the described construction, the escapement movements of the feed dogs are accelerated, that is to say, they are completed earlier than would be the case if the rack were fixed upon the carriage, since in such a case the escapement movements of the dogs would not be completed until the feeding movement of the carriage was completed, and hence the dogs could not be reactuated before the arrest of the carriage, whereas in high speed writing it is desirable that the dogs may return to normal position and be started for a new movement before the completion of the feeding movement of the carriage, which advantage is gained by the described construction.

By the operation of the key 150 a temporary disconnection is effected between the feeding mechanism and the type bars, so as to prevent the actuation of the feeding mechanism by the type keys, said disconnection being caused by a movement of the universal bar 27 to an inoperative position; that is to say, the movement of the described universal bar from normal to inoperative position and back again causes no movement of the escapement mechanism. The space key 160 may be depressed to cause a feed of the carriage, and before it is released from finger pressure the type keys may be operated to make their impressions and also to cause the carriage to feed; in other words, the space key automatically releases the escapement mechanism, so that the latter may be subsequently operated by the type keys without relief of said space key from finger pressure. The release of the carriage for an advance movement is caused at the initial stroke of the space key. The latter is connected to the feed mechanism independently of the universal bar 27, thus enabling the space key to be operated at almost the same instant as the preceding type key, and without waiting for the return of the universal bar to normal position, so that spaces between words may be made more expeditiously than heretofore. The key 193 is so connected to the carriage feeding mechanism as to cause the carriage to feed continuously during the finger pressure upon said key.

Inasmuch as an advance movement of the carriage is permitted at the initial stroke of the escapement mechanism, there would result a blur upon the paper if the type should be held against same during said movement of the carriage, but this objection is avoided by arresting the key 4 by the pad 22 before the type reaches the platen, so that the finger pressure upon the key is not transmitted to the type bar when the type is making its impression, but said finger pressure is sustained wholly by the pad; hence the type bar is enabled to rebound from the platen and cannot produce a blurred or double impression. So long as this result is attained, the tripping mechanism may be disregarded, although I prefer to use said tripping mechanism, so that the type bar may at once complete its return to normal position independently of the key.

The carriage escapement mechanism comprises a double row of parallel stud-like teeth having beveled sides, the points of the teeth in one row being directed oppositely to the points of the teeth in the other row, and key-operated escapement devices connected to said teeth. As illustrated at Fig. 11, the teeth 41 project below the body of the rack and point outwardly, while the pallets 45 and 46 point inwardly.

It should be understood that from certain aspects of my invention the carriage escapement mechanism may be regarded merely as such; that from certain other aspects it may be regarded merely as a speed controller for regulating the speed of the carriage for tabulating and other purposes, and that as a speed controller said devices may be used in combination with various other mechanisms to accomplish the desired ends. From certain other aspects the escapement mechanism may be regarded as a combined escapement mechanism and speed controller for the carriage. It will also be understood that the feed dogs coöperate with a rack to form movable mechanism or a speed controller actuated by the feed rack and that I have provided a controlling key, as 193 for instance, which controls said mechanism to afford a constant intermittent feed movement of the carriage as long as pressure is exerted upon said controlling key; that the said dogs under certain circumstances afford a movement of the carriage for a number of tooth space distances of the rack, the number of tooth space distances depending upon the length of time pressure is maintained on the controlling key; that the said feed dogs and the lever which carries them constitute a vibratory device that is actuated by the feed rack to afford a continuous feed movement of the carriage by a single operation of the controlling key; that the controlling key renders said vibratory device or movable mechanism operative; that the same mechanism affords either a step-by-step or a continuous feed of the carriage depending on whether one or another key is actuated; that the speed controller is operated by the power applied to move the carriage and that the controlling key renders the speed controller operative. The carriage, during a continuous run thereof, imparts an enforced vibration to the lever 42 and the parts connected therewith, which has a retarding effect on the carriage. The resistance which a retarding device of this character offers to the motion of the part to which it is connected, is slight for a slow speed of said part, but increases as the speed increases. It will also be seen that the feed dogs have flat or non-beveled working faces; that nevertheless means are provided for automatically affording an advance of the carriage during the disengagement of said dogs or toothed members, and that the actuation of the escapement device is effected wholly by the power employed to move the carriage.

In order to carry out the general intent of my invention, I have devised novel contrivances which I desire to secure hereby, whether used alone or in connection with the other portions of the invention.

Variations too numerous to illustrate may be made in the manner of carrying out my invention in its several features, without departing from the scope thereof; and although some of the appended claims cover details of construction, it is not my intention to be limited to such details, so far as the broader features of the invention are concerned.

What I claim as new, and desire to secure by Letters Patent, is:

1. In a typewriting machine, the combination with a series of finger-keys, a series of type-bars and a power-driven carriage, of feed devices controlled by said finger keys, means for reducing the pressure of the carriage power upon the finger keys, and means for enabling the keys to be successively operated without releasement.

2. In a type-writing machine, the combination with the power-driven carriage of an escapement rack; a tooth having a flat or non-beveled working face and which normally is in position for detaining the rack, and which escapes from the rack during the advance movement of the carriage; means for reëngaging the tooth to the rack; and means connected to the keys for controlling the escapement action of the tooth.

3. In a type-writing machine, the combination with the power-driven carriage of an escapement rack; a lever having a tooth which normally is in position for detaining the rack, and which is actuated by the rack to move the lever until the tooth escapes from the rack; means for causing the tooth to reëngage the rack; and means controlled by the keys for preventing the movement of the lever under the pressure of the rack.

4. In a type-writing machine, the combination with the power-driven carriage of an escapement rack; a lever which is vibrated in opposite directions by the rack; and means connected to the finger-keys and engaging a free end of said lever for controlling the vibrations of the lever.

5. In a type-writing machine, the combination with the power-driven carriage of an escapement rack; a lever provided with a tooth which normally is in position for detaining the rack and which escapes from the rack during the advance movement of the carriage; means for reëngaging the lever and rack; and means connected to the keys and coöperating with said lever for controlling the escapement action of the lever.

6. In a type-writing machine, the combination with the power-driven carriage of an escapement rack; pallets moved into and out of engagement with the rack by the power applied to the carriage, said pallets having flat non-beveled working faces which alternately engage the rack and escape therefrom during a letter space advance movement of the carriage; and operative connections between the pallets and the finger-keys.

7. In a type-writing machine, the combination with the power-driven carriage of an escapement rack; pallets having flat or non-beveled working faces that coöperate with the rack and alternately detain the rack for successive type-impressions, and which escape from the rack during the advance movements of the carriage; and operative connections between the pallets and the finger-keys.

8. In a type-writing machine, the combination with the power-driven carriage of an escapement rack; a lever provided with pallets moved into and out of engagement with the rack by the power applied to the carriage, said pallets alternately engaging the rack and escaping therefrom during the advance movement of the carriage; and operative connections between the lever and the finger-keys for controlling the movement of the lever.

9. In a type-writing machine, the combination with the power-driven carriage of an escapement rack; a lever provided with pallets which alternately detain the rack for successive type-impressions, and which escape from the rack during the advance movements of the carriage; and operative connections between the lever and the finger-keys for controlling the movement of the lever.

10. In a type-writing machine, the combination with the power-driven carriage of an escapement rack; a vibratory lever provided with pallets moved into and out of engagement with the rack by the power applied to the carriage, said pallets alternately engaging the rack and escaping therefrom during the advance movement of the carriage; a stop, such as 48, for limiting the vibration of the lever; and operative connections between the lever and the finger-keys for controlling the movement of the lever.

11. In a type-writing machine, the combination with the power-driven carriage of an escapement-rack provided with two rows of teeth; a lever provided with and operated by two rack-driven pallets, one working in each row; and operative connections between the lever and the finger-keys.

12. In a type-writing machine, the combination with the power-driven carriage of an escapement-rack provided with two rows of teeth projecting below the body of the rack and pointing in opposite directions; a lever provided with and operated by two rack-driven pallets, one working in each row; and operative connections between the lever and the finger-keys.

13. In a typewriting machine, the combination with the power-driven carriage of an escapement rack provided with two rows of outwardly pointing teeth; a lever provided with and operated by two inwardly pointing pallets, one working in each row; and operative connections between the lever and the finger keys, the pressure of the power driven carriage operating on one pallet to move the other into engagement with the rack.

14. In a type-writing machine, the combination with the power-driven carriage of an escapement rack; a rack-actuated lever provided with and operated by a tooth which is normally in engagement with the rack; and a key-operated trigger which normally detains the lever, but which when operated permits the lever to be moved by the rack.

15. In a type-writing machine, the combination with the power-driven carriage of an escapement rack; a lever provided with and operated by pallets which alternately engage the rack, and which escape from the rack during the advance movements of the carriage; and a key-operated trigger which normally detains the lever, but which when operated permits the lever to be moved by the rack.

16. In a type-writing machine, the combination with the power-driven carriage of an escapement rack; a lever provided with and operated by pallets which alternately engage the rack to stop it, and which escape from the rack during the advance movements of the carriage; and a key-operated trigger which normally detains the lever when either pallet is in engagement with the rack.

17. In a type-writing machine, the combination with the power-driven carriage of an escapement rack; a toothed lever normally in engagement with the rack and adapted to be moved thereby; a trigger for the lever arranged at such a point that the pressure of the lever upon the trigger is less than the pressure of the rack upon the lever-tooth; and operative connections between the trigger and the finger-keys.

18. In a type-writing machine, the combination with the power-driven carriage of an escapement rack; a lever provided with pallets which alternately engage the rack and by which the rack vibrates the lever; a trigger for the lever arranged at such a point that the pressure of the lever upon the trigger is less than the pressure of the rack upon the pallet; and operative connections between the trigger and the finger-keys.

19. In a type-writing machine, the combination with the power-driven carriage of an escapement rack; a lever provided with a tooth which is normally in engagement with the rack; a key-operated trigger which normally detains the lever but which when operated permits the lever to be moved by the rack; and a check connected to the trigger to insure the reëngagement of the lever therewith.

20. In a type-writing machine, the combination with the power-driven carriage of an escapement rack; a lever provided with pallets which alternately engage the rack to stop it, and which escape from the rack during the advance movements of the carriage; a key-operated trigger which normally detains the lever when either pallet is in engagement with the rack; and a check connected to the trigger to insure the reëngagement of the lever therewith.

21. In a type-writing machine, the combination of a series of tripping type-bars; a power-driven carriage; an escapement rack therefor; a toothed lever which normally is in position for detaining the rack and the carriage, and which escapes from the rack during the advance movement of the carriage; a trigger which normally detains the lever; and means for operating the trigger to release the lever and carriage at the printing stroke of the type-bars.

22. In a type-writing machine, the combination of a series of tripping type-bars, a power-driven carriage; an escapement rack therefor; a toothed lever which normally is in position for detaining the rack and the carriage, and which escapes from the rack during the advance movement of the carriage; a trigger which normally detains the lever; and means for operating the trigger to release the lever and carriage at the initial stroke of the universal-bar.

23. In a type-writing machine, the combination of a series of tripping type-bars; a tripping universal-bar; a power-driven carriage; an escapement rack therefor; a toothed lever which is normally in engagement with the rack and detains the carriage, and which escapes from the rack during the advance movements of the carriage; a trigger which normally detains the lever; means for operating the trigger to release the lever and carriage at the initial stroke of the universal-bar; and a check which insures the reëngagement of the trigger and toothed lever.

24. In a typewriting machine, the combination of feed dogs, a series of finger-keys which release the feed dogs from their control, and a carriage which replaces the feed dogs under the control of the finger-keys.

25. In a type-writing machine, the combination with a power-driven carriage, a series of finger-keys and a series of types of two key-controlled feed dogs which alternately bring the carriage to a stop for successive type impressions.

26. In a type-writing machine, the combination with a power-driven carriage, a series of finger-keys, and a series of types, of a key-controlled vibratory lever provided with teeth which alternately bring the carriage to a stop for successive type impressions.

27. In a type-writing machine, the combination with a power-driven carriage and an escapement rack of a key-controlled feed-lever provided with and operated by a pivoted tooth, which normally detains the rack, which escapes from the rack during the advance movements of the carriage, and which permits the return of the carriage independently of the feed-lever.

28. In a type-writing machine, the combination with a power-driven carriage and an escapement rack of a key-controlled feed-lever provided with two pivoted pallets, which alternately detain the rack and escape from the rack during the advance movements of the carriage, and which permit the return of the carriage independently of the feed-lever.

29. In a type-writing machine, the combination with a power-driven carriage and an escapement rack of key-controlled dogs which alternately detain the rack for successive type impressions, which yield to enable the rack to pass freely when the carriage is returned, and either of which may thereupon detain the rack for a type impression.

30. In a type-writing machine, the combination with a power-driven carriage and an escapement rack of a key-controlled dog which normally detains the rack, which turns upon one pivot to escape from the rack during the advance movements of the carriage, and which turns upon another pivot to permit the rack to pass during the return movement of the carriage.

31. In a type-writing machine, the combination with the rack-frame, the carriage feed mechanism and the platen-frame hinged to the rack frame, of a release-bar, such as 104, arranged upon the rack frame; an operating arm therefor, such as 106, pivoted to the rack frame; and a finger-lever pivoted upon the platen-frame, and adapted to bear in one direction upon the operating-arm when the platen frame is down in working position, and in another direction when the platen frame is swung up to expose the writing.

32. In a type-writing machine, the combination with the power-driven rack frame, the carriage feed mechanism, and the platen frame hinged to the rack frame, of a release-bar, such as 104, arranged upon the rack-frame; an operating arm therefor, such as 106, pivoted to the rack frame; and a finger lever which when pressed in a direction opposite to the carriage tension bears in one direction upon the operating arm if the carriage is down in working position, and in another direction thereon if the platen frame is swung up to expose the writing.

33. In a typewriting machine, the combination with a type key, a power-driven carriage, and an escapement rack, of dogs constructed to engage said rack, and means for causing said dogs to escape from said rack and to be thrown out of control of said key, said dogs being caused by the rack to be again thrown into control of the key.

34. In a typewriting machine, the combination with a power-driven carriage, of a series of escapement teeth, means for causing said series of teeth to advance independently of the carriage during the feeding movements of the latter, and key-controlled dogs engaging said escapement teeth.

35. In a typewriting machine, the combination with a carriage, a carriage driving spring, and feed dogs, of a feed rack, a separate spring for said feed rack, means whereby said feed rack is moved by its spring independently of the carriage during the feed movements of the carriage, so as to permit earlier re-actuation of the escapement devices.

36. In a typewriting machine, the combination with a carriage, and feed dogs, of a feed rack which is loosely connected to the carriage, and means whereby said feed rack advances independently of the carriage in the direction of the carriage feed during the feeding movement of the carriage.

37. In a typewriting machine, the combination with a power-driven carriage, of a series of escapement teeth, key-controlled feed dogs operated wholly by said escapement teeth, and means for causing, during the advance movements of the carriage, a relative movement between said escapement teeth and said dogs, so that said dogs are brought to position for a new actuation thereof before the completion of the advance movement of the carriage.

38. In a typewriting machine, the combination with a carriage, and feed dogs, of a feed rack which is loosely connected to the carriage, means whereby said feed rack is advanced independently of the carriage in the direction of the feed of the carriage during the advance movement of the latter, and a stop which limits the independent movements of the rack.

39. In a typewriting machine, the combination with a power driven carriage, of feed dogs, a feed rack, means whereby said feed dogs are moved wholly by said feed rack, and means whereby said feed rack moves independently of and in advance of said carriage during the feed movements of the latter.

40. In a typewriting machine, the combination of a power driven carriage, escapement mechanism including feed dogs, means whereby said feed dogs are moved wholly by the power applied to the carriage, and means for quickening the action of the feed dogs, whereby said dogs complete their movement before the carriage completes its stepping movement.

41. In a type-writing machine, the combination of a power-driven carriage; a feed rack therefor; feed dogs; a series of type-bars; a series of keys; means whereby the keys may successively operate the type-bars and feed dogs without releasing any key; and means operated by the carriage-driving power for quickening the escape movements of the feed dogs from the rack.

42. In a typewriting machine, the combination of carriage feed mechanism, printing mechanism including printing keys, means other than said printing keys which are at all times operable to control said carriage feed mechanism to afford a feed of the carriage, and means operable at will for temporarily effecting a disconnection between said printing keys and said carriage feed mechanism, the printing keys at such time being operative to print.

43. In a typewriting machine, the combination of a series of key-operated levers; a universal bar of the carriage-feeding mechanism which is moved by the levers; and means for temporarily moving the universal bar to an inoperative position, where it will not be actuated by the levers at their operation, the movement of the universal bar to inoperative position being effected independently of the portion of the carriage-feeding mechanism controlled by said universal bar.

44. In a type-writing machine, the combination of type-operating keys; carriage-feeding mechanism; a space-key which operates and releases the feeding mechanism, so that it may be subsequently operated by a type-key without releasing the space-key from pressure; and means for temporarily preventing the actuation of the feeding mechanism by the type-keys.

45. In a type-writing machine, the combination of type-operating keys; carriage-feeding mechanism; a universal-bar which is operated by the type-keys; a space-key which operates the carriage-feeding mechanism independently of the universal-bar; and means for temporarily preventing the actuation of the feeding mechanism by the type-keys.

46. In a type-writing machine, the combination with the carriage-feeding mechanism, the type-operating keys, and a space-key which at all times permits the advance movement of the carriage, of means for temporarily preventing the actuation of the feeding mechanism by the type-keys; said keys being at such time still operative to actuate the types.

47. In a type-writing machine, the combination, with a carriage, a series of type bars, and finger-keys which may successively operate the type-bars and feed the carriage without any key being relieved of finger-pressure, of a space-key which feeds the carriage and without being relieved from finger-pressure permits subsequent feeding of the carriage by the type-bar operating keys.

48. In a type-writing machine, the combination of a power-driven carriage; escapement mechanism; a series of type-bars; a series of finger-keys; means whereby each key is enabled to operate and automatically release its associated type-bar and the escapement mechanism; and a space-key which operates and automatically releases the escapement mechanism, so that said escapement mechanism may be subsequently operated by the type keys without relief of said space key from pressure.

49. In a type-writing machine, the combination of a carriage; feed dogs; a series of type-bars; a series of finger-keys; means whereby each key is enabled to operate and automatically release its associated type-bar and the feed-dogs; and a space-key which releases the carriage at its initial stroke and permits subsequent operation of the feed by the type-keys without relief of the space-key from pressure.

50. In a type-writing machine, the combination of a carriage; feed-dogs; a series of type-bars; a series of finger-keys; means whereby each key is enabled to operate and automatically release its associated type-bar; mechanism connecting the keys to the dogs and operating at its initial movement to release the carriage for advance movement; means for automatically disconnecting such carriage-feeding mechanism from the operating key so that it may be operated by another key without relieving the first of finger-pressure; and a space-key which releases the carriage at its initial stroke and permits subsequent operation of the feed by the type-keys without relief of the space-key from pressure.

51. In a type-writing machine, the combination of a carriage; a carriage-feeding mechanism constructed and arranged to release the carriage upon the initial stroke of said feeding mechanism, a reciprocatory universal bar connected to said feeding mechanism; a series of type-bars; a series of keys, each of which may operate and automatically release both its associated type-bar and the universal-bar; and a space-key connected to the feed mechanism independently of the universal-bar.

52. In a type-writing machine, the combination of a carriage; a reciprocatory universal-bar of the carriage-feeding mechanism; a series of type-bars; a series of keys, each of which may operate and automatically release both its associated type-bar and the universal-bar; and a space-key connected to the feed mechanism independently of the universal-bar, and operating to actuate and automatically release the feed mechanism, so that said feed mechanism may be subsequently operated by the type keys without relief of said space key from pressure.

53. In a type-writing machine, the combination of a carriage; a reciprocatory universal-bar of the carriage-feeding mechanism; a series of type-bars; a series of keys, each of which may operate and automatically release both its associated type-bar and the universal-bar; and a space-key connected to the feed mechanism independently of the universal-bar, and operating at its initial stroke to actuate the feed mechanism to release the carriage, and then to automatically release the feed mechanism so that it may be operated by another key independently of the relief of the space-key from pressure.

54. In a type-writing machine, the combination of a carriage; a feed-rack therefor; a reciprocatory universal-bar of the carriage-feeding mechanism; a series of type-bars; a series of finger-keys, each of which may operate and automatically release its associated type-bar and the universal-bar; a space-key connected to the feed mechanism independently of the universal-bar, and operating to actuate and automatically release the feed mechanism; the carriage being released for advance movement at the initial stroke of the space-key, and means for moving the rack independently of the carriage to accelerate the movement of the carriage-feeding mechanism.

55. In a type-writing machine, the combination with the carriage-feeding mechanism and the finger-keys of a weight which is actuated by a key to mechanically operate and then automatically release the feeding mechanism independently of the relief of the key from pressure, so that the feeding mechanism may be subsequently operated by other keys.

56. In a type-writing machine, the combination with the carriage-feeding mechanism and the finger-keys of a weight which is actuated by a space-key to operate and then automatically release the feeding mechanism independently of the relief of the space key from pressure, so that the feeding mechanism may be independently operated by the type-keys.

57. In a type-writing machine, the combination with the carriage-feeding mechanism of a space-key lever provided with a plunger which is thrown up to operate the feed at the actuation of the key, and which upon its return movement releases the feed mechanism independently of the relief of the space key from pressure.

58. In a typewriting machines the combination with a moving part, such as a striker, of a weight moving therewith and independently thereof, and means operating at the stoppage of the striker for causing the weight while moving independently of the striker to press the striker in the direction of the object struck, so as to oppose rebound of said striker from said object.

59. In a type-writing machine, the combination with the carriage-feed mechanism of a space-key provided with a plunger which at the cessation of the movement of the space-key continues in motion and operates the feeding mechanism; means for arresting the plunger at the completion of its feed-stroke; and a weight connected to the plunger in a manner to prevent the rebound thereof.

60. In a type-writing machine, the combination with the carriage-feeding mechanism of a space-key provided with a plunger which at the cessation of the movement of the space-key continues in motion and operates the feeding mechanism; and means for preventing the plunger from rebounding and thereby re-operating the feeding mechanism.

61. In a type-writing machine, the combination with the carriage-feeding mechanism of a space-key provided with a plunger-rod, such as 175, which operates the feeding mechanism after the cessation of the keystroke; and a sleeve, such as 180, arranged upon the rod and connected thereto so as to turn diagonally thereon at the cessation of the plunger stroke.

62. In a typewriting machine, the combination with the carriage and letter feed mechanism, of a series of type keys, each of which may cause the carriage to advance step-by-step for letter spacing, and a key which causes the carriage to feed continuously under control of the letter feed mechanism during finger pressure on said last mentioned key.

63. In a type-writing machine, the combination with the carriage and letter-feed mechanism of a series of type-keys and a space-key, any of which may feed the carriage a letter-space distance, of a key which causes the carriage to feed continuously under control of the letter feed mechanism during finger-pressure on said last mentioned key.

64. In a type-writing machine, the combination with a power-driven carriage which imparts impulses to the feed mechanism of means controlled by the operator for applying a yielding operative pressure to the feed mechanism; the construction and arrangement being such that the yielding pressure releases the carriage for advance movement, and such that the impulse imparted by the rack to the feed mechanism overcomes the yielding pressure and restores the feed mechanism to a position where it may again be actuated by the yielding pressure to again release the rack; so that the carriage movement continues as long as the yielding pressure is maintained.

65. In a type-writing machine, the combination with the power-driven carriage and the carriage-rack of means for diminishing the rack-pressure upon the finger-operated feeding devices; means for enabling the carriage-driving power to impart impulses to the feeding devices; and means controlled by the operator for applying a yielding operative pressure to the feed mechanism; the construction and arrangement being such that the yielding pressure releases the carriage for advance movement, and such that the impulse imparted by the carriage-driving power to the feed mechanism overcomes the yielding pressure and restores the feed mechanism to a position where it may be again actuated by the yielding pressure to again release the rack; so that the carriage movement continues as long as the yielding pressure is maintained.

66. In a type-writing machine, the combination with the power-driven carriage of a series of type-keys, each of which may cause the carriage to advance for letter-spacing; a key which causes the carriage to feed continuously during finger-pressure thereon; and means for temporarily increasing the sensitiveness of the feeding devices during the actuation of said key.

67. In a type-writing machine, the combination of a power-driven carriage; a rack therefor; an escapement-lever actuated by the carriage-driving power through the rack; a trigger moved in one direction by the finger-keys, and in the other direction by the escapement-lever; and means for applying yielding pressure to the trigger, so that the carriage-feeding operation may continue as long as the yielding pressure is maintained.

68. In a type-writing machine, the combination of a power-driven carriage; a rack therefor; an escapement-lever actuated by the carriage-driving power through the rack; a check and trigger which are moved in one direction by the finger-keys, and in the other direction by the escapement-lever, the trigger having a limited movement independently of the check; and means for applying yielding pressure to the trigger, so that the carriage-feeding operation may continue as long as the yielding pressure is maintained; the trigger occupying such a relation to the check during the application of the yielding pressure that the sensitiveness of the feeding movement is increased.

69. In a typewriting machine, the combination with a platen, a power-driven carriage and a finger key, of an escapement mechanism so constructed and arranged that upon its initial or forward stroke an advance movement of the carriage is permitted, a type bar connected to said finger key, and a pad constructed and arranged to arrest the key before the completion of the type bar stroke, the connection between the type bar and the key permitting the completion of the printing stroke of the type bar after the arrest of the key, and the type bar receding from the platen while the key is held down against said pad.

70. In a typewriting machine, the combination with a power-driven carriage, of a double row of parallel stud-like teeth having beveled sides, the points of the teeth in one row being directed oppositely to the points of the teeth in the other row, and key-operated pointed escapement devices constructed and arranged to engage said teeth and including means which afford an advance of the carriage during the disengagement of said devices from said teeth.

71. In a typewriting machine, the combination of a power driven carriage, a feed rack, dogs coöperating therewith, key operated means operatively connected to said dogs, the parts being constructed and arranged to afford a movement of the carriage for a number of tooth space distances at each depression of the key, the number of tooth space distances depending on the length of time pressure is maintained on the key.

72. In a typewriting machine, the combination of a power driven carriage, carriage feeding instrumentalities and key operated means for controlling said carriage feeding instrumentalities so as to afford a step-by-step feed movement of the carriage at each operation of a key or a continuous feed of the carriage under control of feeding instrumentalities as long as pressure is maintained on a key.

73. In a typewriting machine, the combination of a power driven carriage, a feed rack, feed dogs that coöperate with said rack, and key controlled means for rendering said dogs operative to afford at will either a step-by-step feed movement of the carriage or a constant feed movement of the carriage as long as pressure is maintained on a key.

74. In a typewriting machine, the combination of a power driven carriage, a feed rack and key controlled means actuated by and coöperating with said rack to afford either a step-by-step feed movement of the carriage or a continuous movement of the carriage under control of said means as long as a key is maintained depressed.

75. In a typewriting machine, the combination of a power driven carriage, a feed rack, and a vibratory device that is actuated by said feed rack to afford a continuous feed movement of the carriage.

76. In a typewriting machine, the combination of a power driven carriage, a feed rack, and a key-connected vibratory mechanism that is actuated by said feed rack to afford a continuous feed movement of the carriage as long as pressure is maintained on a key.

77. In a typewriting machine, the combination of a power driven carriage, movable mechanism that is moved by the power applied to the carriage and controls the movement of the carriage in a letter feed direction, and a key for rendering said movable mechanism operative and for affording a continuous feed of the carriage by a single operation of said key.

78. In a typewriting machine, the combination of a power driven carriage, vibrating mechanism that is vibrated by the power applied to the carriage and controls the movement of the carriage in a letter feed direction, and a key for rendering said vibrating mechanism operative.

79. In a typewriting machine, the combination of a power driven carriage, a feed rack therefor, movable mechanism adapted to be actuated by said feed rack, and a key for controlling said movable mechanism to afford a continuous movement of the carriage.

80. In a typewriting machine, the combination of a power driven carriage, a feed rack therefor, movable mechanism adapted to be actuated by said feed rack, and a key for controlling said movable mechanism to afford a continuous movement of the carriage as long as pressure is exerted upon said controlling key.

81. In a typewriting machine, the combination of a power driven carriage, key actuated means for affording a step-by-step letter feed movement of the carriage, and key-actuated means for affording a constant intermittent feed movement of the carriage by a single operation of a key.

82. In a typewriting machine, the combination of a power driven carriage, a feed rack therefor, key actuated means coöperating with and actuated by said rack for affording a step-by-step feed movement or for affording a continuous movement of the carriage by a single operation of a key as may be desired.

83. In a typewriting machine, the combination of a power driven carrier, a feed rack therefor, dog mechanism coöperating therewith, a key coöperating with said dog mechanism to afford a step-by-step feed of the carriage at each actuation of said key and another key coöperating with said dog mechanism to afford a continuous feed of the carriage under control of said dog mechanism by a single operation of a key.

84. In a typewriting machine, the combination of a power driven carriage, a feed rack therefor, and key actuated dog mechanism which affords a step-by-step feed of the carriage or a continuous feed of the carriage under control of said dog mechanism as desired, the step-by-step feed or a continuous feed of the carriage being determined by the operation of one or another key.

85. In a typewriting machine, the combination of a power driven carriage, a coöperating lever that is vibrated by the power applied to move the carriage and which is adapted to control the movement of the carriage in the direction of its feed and to afford a continuous movement of the carriage, and a key for determining when the said lever may be rendered effective to control the carriage during the continuous feed thereof.

86. In a typewriting machine, the combination of a power driven carriage, and means for affording a step-by-step intermittent letter space feed or a continuous run as may be desired, said means including a device actuated by the power applied to move the carriage in order to control the speed of the carriage when it is free to make a continuous run, and a key for rendering said device operative as a speed controller.

87. In a typewriting machine, the combination of a power driven carriage, and means for affording a step-by-step intermittent letter space feed or a continuous run as may be desired, said means including a feed rack, a device actuated by said feed rack in order to control the speed of the carriage when it is free to make a continuous run, and a key for rendering said device operative as a speed controller.

88. In a typewriting machine, the combination of a power driven carriage, letter-feed escapement devices for causing a positive step-by-step feed of the carriage during the writing of words, key actuated means for enabling the carriage to run down in the direction of its feed, and means operated by the carriage for controlling the speed of the carriage during such run.

89. In a typewriting machine, the combination of a power driven carriage having a feed rack, feed dogs for causing said carriage to move step-by-step during the writing of words, means for enabling said carriage to run in the direction of its letter feed movement, and means operative by the feed rack for retarding the speed of the carriage during such run.

90. In a typewriting machine, the combination of a power driven carriage, step-by-step feeding devices therefor, a key for causing a continuous run of the carriage, and means controlled by the carriage driving power for controlling and retarding such run.

91. In a typewriting machine, the combination of a power driven carriage adapted normally to move step-by-step in the letter-feed direction, a key for changing the action of the carriage from a step-by-step feed action to a skipping one, and means operated by the carriage for governing the speed of the carriage during such skipping action.

92. In a typewriting machine, the combination of a power driven carriage, step-by-step feeding mechanism, skipping mechanism controlled by the carriage and controlling said carriage, and a key for putting the carriage into control of said skipping mechanism.

93. In a typewriting machine, the combination of a power driven carriage, key controlled skipping mechanism including means operated by the carriage and in turn controlling the carriage for regulating the speed of the carriage.

94. In a typewriting machine, the combination of a power driven carriage, escapement devices including coöperating toothed engaging members with flat or non-beveled working faces, and means which afford an advance of the carriage during the disengagement of said toothed members.

95. In a typewriting machine, the combination of a power driven carriage, escapement devices including coöperating toothed engaging members with flat or non-beveled working faces, and means for automatically affording an actuation of the escapement devices into and out of engagement by the power employed to move the carriage.

96. In a typewriting machine, the combination of a power driven carriage, escapement devices including coöperating toothed engaging members with flat or non-beveled working faces, and means for utilizing the power employed to move the carriage for effecting a disengagement of the coöperating toothed engaging members.

97. In a typewriting machine, the combination of a power driven carriage, escapement devices including coöperating toothed engaging members with flat or non-beveled working faces, and means for utilizing the power employed to move the carriage for effecting a disengagement and reëngagement of the coöperating toothed engaging members.

98. In a typewriting machine, the combination of a power driven carriage, key controlled escapement devices including coöperating toothed engaging members with flat or non-beveled working faces, and means which afford an advance of the carriage during a key depression and before the toothed engaging members are disengaged.

99. In a typewriting machine, the combination of a power driven carriage, key controlled escapement devices including coöperating toothed engaging members with flat or non-beveled working faces, and means which afford a letter feed advance of the carriage during a key depression and during the disengagement and reëngagement of said toothed members.

100. In a typewriting machine, the combination of a carriage, escapement mechanism therefor, printing instrumentalities, keys for actuating said printing instrumentalities, key-actuated means operable at will for rendering the character keys ineffective to actuate the escapement mechanism, and means for affording an operation of the escapement mechanism at will when the escapement mechanism is out of control of the character keys.

101. In a typewriting machine, the combination of a carriage, escapement mechanism therefor, printing instrumentalities, finger keys for actuating said printing instrumentalities, means for operating the escapement mechanism at each actuation of the printing instrumentalities, key-controlled locking means operable at will for rendering the escapement mechanism inoperable by the character keys, and auxiliary means for affording an operation of the escapement mechanism at will when the escapement mechanism is locked out of control of the character keys.

102. In a typewriting machine, the combination of a power driven carriage, escapement devices including coöperating toothed engaging members, and means independent of the working faces of said toothed engaging members for affording an advance of the carriage during each disengagement of the toothed members.

103. In a typewriting machine, the combination of a power driven carriage, escapement devices including coöperating toothed engaging members, and means independent of the working faces of said toothed engaging members for automatically affording an actuation of the escapement devices into and out of engagement by the power employed to move the carriage.

104. In a typewriting machine, the combination of a power driven carriage, a feed rack, and feed dogs actuated in the operation of step-by-step carriage feed wholly by said rack.

105. In a typewriting machine, the combination of a power-driven carriage, a feed rack, feed dogs which coöperate therewith, and means whereby the power applied to move the carriage is effective to produce a relative back and forth movement between the feed dogs and rack transversely of said rack.

106. In a typewriting machine, the combination with a carriage feeding mechanism comprising a feed rack and coöperating feeding instrumentalities, of operating keys, and means for affording a temporary disconnection between the feeding instrumentalities and certain only of said operating keys.

107. In a typewriting machine, the combination of a series of printing keys, a universal bar of the carriage-feeding mechanism which is moved by said printing keys, a space key at all times operable to control said carriage feeding mechanism, and means for temporarily moving the universal bar out of control of said printing keys and without affecting the carriage feed mechanism.

108. In a typewriting machine, the combination of printing keys, a power-driven carriage, and means for controlling the motion of said carriage, said controlling means including step-by-step feed devices controlled by said printing keys, and including a device driven by the power that drives the carriage during a continuous run thereof and which offers to the motion of the carriage a resistance that increases with the speed of the carriage.

109. In a typewriting machine, the combination of printing keys, a power-driven carriage, means for controlling the motion of said carriage, said controlling means including step-by-step feed devices controlled by said printing keys, and including a device driven by the power that drives the carriage during a continuous run thereof and which offers to the motion of the carriage a resistance that increases with the speed of the carriage, and a special key for causing a continuous run of the carriage.

110. In a typewriting machine, the combination of a carriage, escapement mechanism therefor, printing keys controlling said escapement mechanism, means for rendering the printing keys inoperative to control the escapement mechanism while the printing function of said keys is maintained, and other means for controlling the escapement mechanism when it is out of control of the printing keys.

111. In a typewriting machine, the combination of a carriage, escapement mechanism therefor, printing keys controlling said escapement mechanism, means for rendering the printing keys inoperative to control the escapement mechanism while the printing function of said keys is maintained, and a space key for controlling the escapement mechanism when it is out of control of the printing keys.

112. In a typewriting machine, the combination of a power driven carriage; and escapement mechanism therefor, said escapement mechanism comprising a feed rack, coöperating feed dogs, and mechanical means other than the feed dogs themselves for causing said feed dogs to move into and out of engagement with the feed rack by the power employed to move the carriage.

113. In a typewriting machine, the combination of a power driven carriage, toothed escapement devices therefor, said escapement devices having flat or non-beveled working faces, and means affording an advance of the carriage at each printing stroke before one escapement member parts company with its associate.

114. In a typewriting machine, the combination of a power driven carriage; and escapement mechanism therefor, said escapement mechanism comprising coöperating carriage feed devices, a lever connected to certain of said feed devices, mechanical means whereby the power employed to move the carriage is effective to move said lever through the engagement of said feed devices, and key controlled releasing means coöperative with said lever and effective to disengage it to free the lever and thereby effect a letter space feed of the carriage.

115. In a typewriting machine, the combination of a power driven carriage; printing instrumentalities including printing keys; an escapement mechanism for said carriage comprising coöperating feed devices; said feed devices being constructed and arranged to be acted upon independently of the keys and wholly by the carriage driving power and by said power to be forced into and out of engagement with each other; the carriage driving power constantly exerting a pressure on said feed devices; and means for resisting the action of the driving power on the feed devices when the keys are at rest.

116. In a typewriting machine, the combination of printing keys; a power driven carriage; and escapement mechanism therefor comprising mechanically actuated carriage feed devices, and means whereby a power independent of that applied to the finger keys is mechanically applied to move certain of said carriage feed devices first in one direction and then in the opposite direction at each actuation of a printing key.

117. In a typewriting machine, the combination of printing keys, a power-driven carriage, escapement devices actuated by a power other than that applied to the printing keys, a trigger under control of said keys for normally holding certain of the escapement devices against actuation, and means whereby the trigger is moved back to normal position by the power applied to move the escapement devices.

118. In a typewriting machine, the combination of a power driven carriage, escapement devices moved to afford a letter spacing movement of the carriage by the power employed to move the carriage, a trip coöperating with certain of said escapement devices, and spring-pressed means carried by the carriage and movable independently thereof and operative to effect a reëngagement between the trigger and escapement devices before the carriage completes its letter space movement.

119. In a typewriting machine, the combination of a power-driven carriage, escapement devices, a controlling means for normally preventing an actuation of the escapement mechanism, keys actuating said controlling means, and means for automatically placing the escapement under control of said controlling means before the carriage has completed a letter space movement.

120. In a typewriting machine, the combination of a power-driven carriage, escapement devices, a key-controlled trigger adapted to be released from but normally controlling the operation of said escapement devices, and means for automatically replacing the escapement under control of the trigger before the carriage completes a letter space movement.

121. In a typewriting machine, the combination of a power-driven carriage, escapement devices, a controlling device normally operatively connected with said escapement devices to control their actuation, key actuated means for disconnecting the controlling device from said escapement device, and means for automatically reëstablishing an operative connection between said controlling device and escapement devices before the carriage has completed its letter space movement.

122. In a typewriting machine, the combination of a power driven carriage and escapement mechanism therefor comprising carriage feed devices, one of which is adapted to advance independently of the carriage during the feed movement of the carriage, and means for causing such independent advance of said feed device and also for causing said feed device to move at a speed greater than that of the carriage during such independent movement.

123. In a typewriting machine, the combination of a power driven carriage and escapement mechanism therefor comprising carriage feed devices actuated wholly by the power of the carriage, and said feed devices comprising also means whereby the engaging and disengaging operations of said feeding devices increase automatically with and proportionately to an increase of power for driving said carriage.

124. In a typewriting machine, the combination of finger keys; a power driven carriage; escapement mechanism therefor comprising mechanically actuated carriage feed devices operated wholly by the carriage driving power, and mechanical means for relieving the finger keys of the pressure exerted by the carriage power on the carriage feed devices in the movement of said carriage feed devices into and out of coöperation with one another.

125. In a typewriting machine, the combination of a power-driven carriage; and escapement mechanism including a feed rack and a dog rocker, the latter being free from pressure to move it except that exerted by the feed rack.

126. In a typewriting machine, the combination of a power driven carriage, escapement mechanism, a key, a universal bar actuated by said key, and means including a variably movable device controlled by said key and movable independently thereof for affording an actuation of the escapement mechanism or not, depending on the force applied to the key to actuate it.

127. In a typewriting machine, the combination of a carriage, escapement mechanism, a key, a universal bar actuated by said key, and means controlled by said key and controlling the escapement mechanism, said means including a variably movable part that is moved by and is movable independently of the key, said part being given more or less throw at each actuation of the key depending on the force applied to said key.

128. In a typewriting machine, the combination of a carriage, escapement mechanism, key actuated means for controlling said escapement mechanism, and an independent automatically actuated means for preventing repeated operations of the escapement mechanism at each depression of said key.

129. In a typewriting machine, the combination of a carriage, escapement mechanism including releasing devices, a key for controlling said releasing devices, and automatically actuated means for preventing rebound of certain of said releasing devices to prevent repeated operations of the escapement at each key depression.

130. In a typewriting machine, the combination of a power-driven carriage; escapement mechanism; a key; and a part movable with and independently of said key and controlling the actuation of the escapement mechanism, an actuation of the escapement mechanism depending on the force applied to the key and whether said part and key move together or said part moves independently of the key.

131. In a typewriting machine, the combination of a power-driven carriage, escapement mechanism, a series of keys controlling said escapement mechanism and each operative at each depression to afford a letter space movement of the carriage, an additional key, and means controlled by said additional key to afford an actuation or not of the escapement mechanism at each depression depending on the force applied to said additional key.

Signed at Elizabeth, in the county of Union and State of New Jersey, this 6th day of December, A. D. 1897.

BURNHAM C. STICKNEY.

Witnesses:
  JOSEPH F. JAQUITH,
  FRANK HARRIS.